United States Patent [19]

Merezhkin

[11] 4,121,096
[45] Oct. 17, 1978

[54] SYSTEM FOR AUTOMATIC CONTROL OF OBJECT BY CONTRAST PROGRAM

[76] Inventor: Vasily Grigorievich Merezhkin, 10 kvartal, 3 aviagorodok 1, kv. 18, Varketilsky massiv, Tbilisi, U.S.S.R.

[21] Appl. No.: 811,837
[22] Filed: Jun. 30, 1977
[51] Int. Cl.² .............................................. G05B 1/00
[52] U.S. Cl. .................................... 250/202; 318/577
[58] Field of Search ............... 250/202, 203, 563, 216; 318/577

[56] References Cited

U.S. PATENT DOCUMENTS

| 3,529,084 | 9/1970 | Rich ..................................... 318/577 |
| 4,020,339 | 4/1977 | Gustafson ............................ 250/202 |

Primary Examiner—David C. Nelms
Attorney, Agent, or Firm—Lackenbach, Lilling & Siegel

[57] ABSTRACT

Disclosure is made of a system for automatic control of an object by a contrast program, which comprises the following components connected in series: an information scanner producing electrical signals whose combination carries information about the coordinate of the contrast program on the surface being analyzed, having a device for converting a specified portion of a radiation flux into an electrical signal carrying information on the contrast program and a reference signal generator producing electrical signals carrying information on the scanning of the analyzed surface; a unit for processing the electrical signals carrying information on the contrast program and on the scanning of the analyzed surface including a unit for forming normalized electrical signals carrying information on the contrast program and a logical circuit for processing the electrical signals carrying information on the contrast program and on the scanning of the analyzed surface producing electrical signals carrying information on the deviation of the object from the specified position with respect to the contrast program, said logical unit being electrically connected to the unit for forming normalized electrical signals and to the reference signal generator; and an actuating mechanism executing the commands to control the object electrically connected to the logical circuit for processing the electrical signals.

9 Claims, 17 Drawing Figures

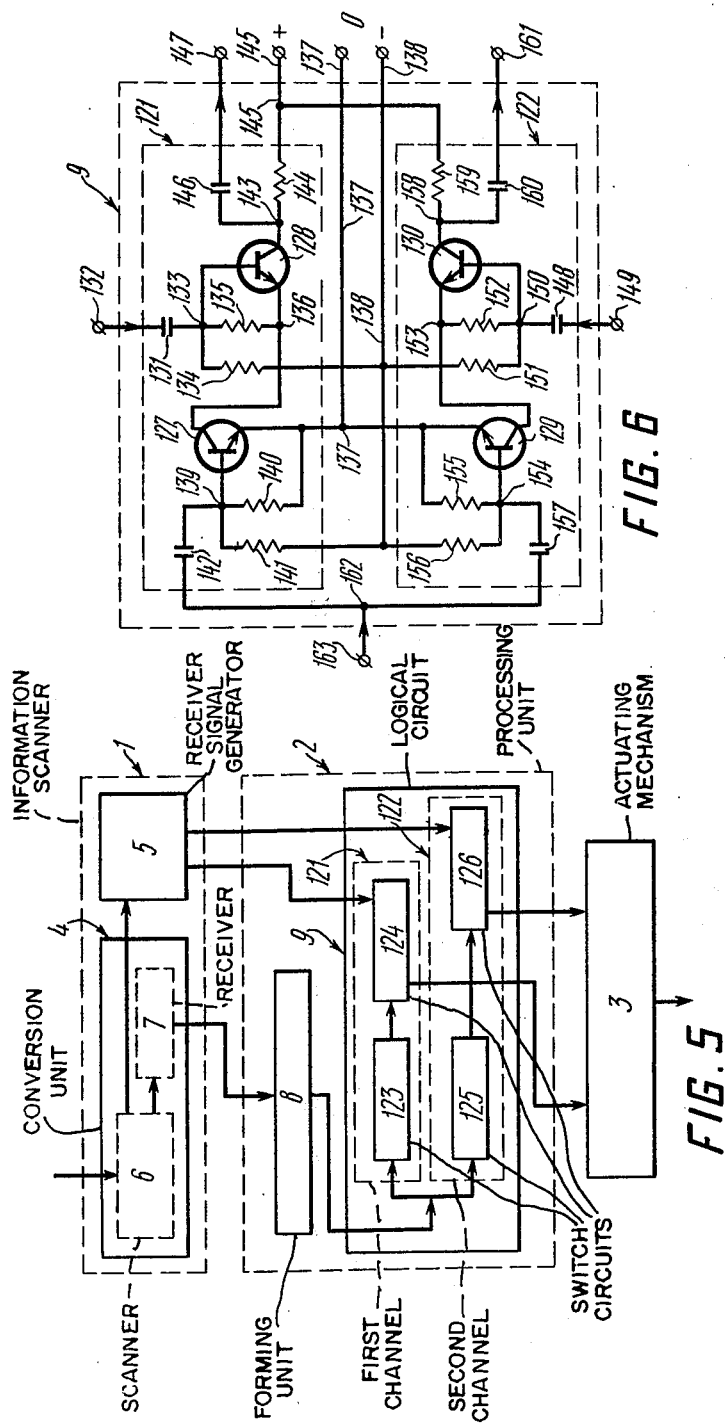

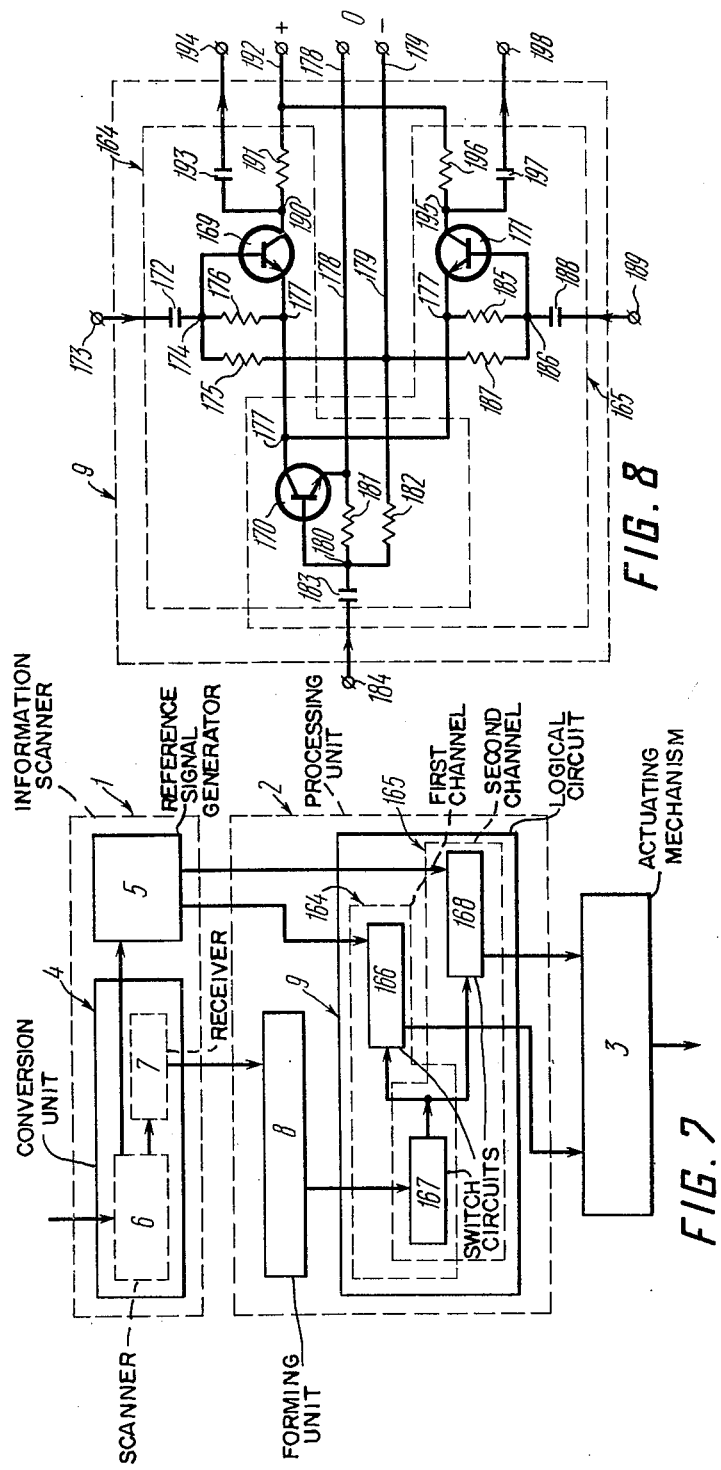

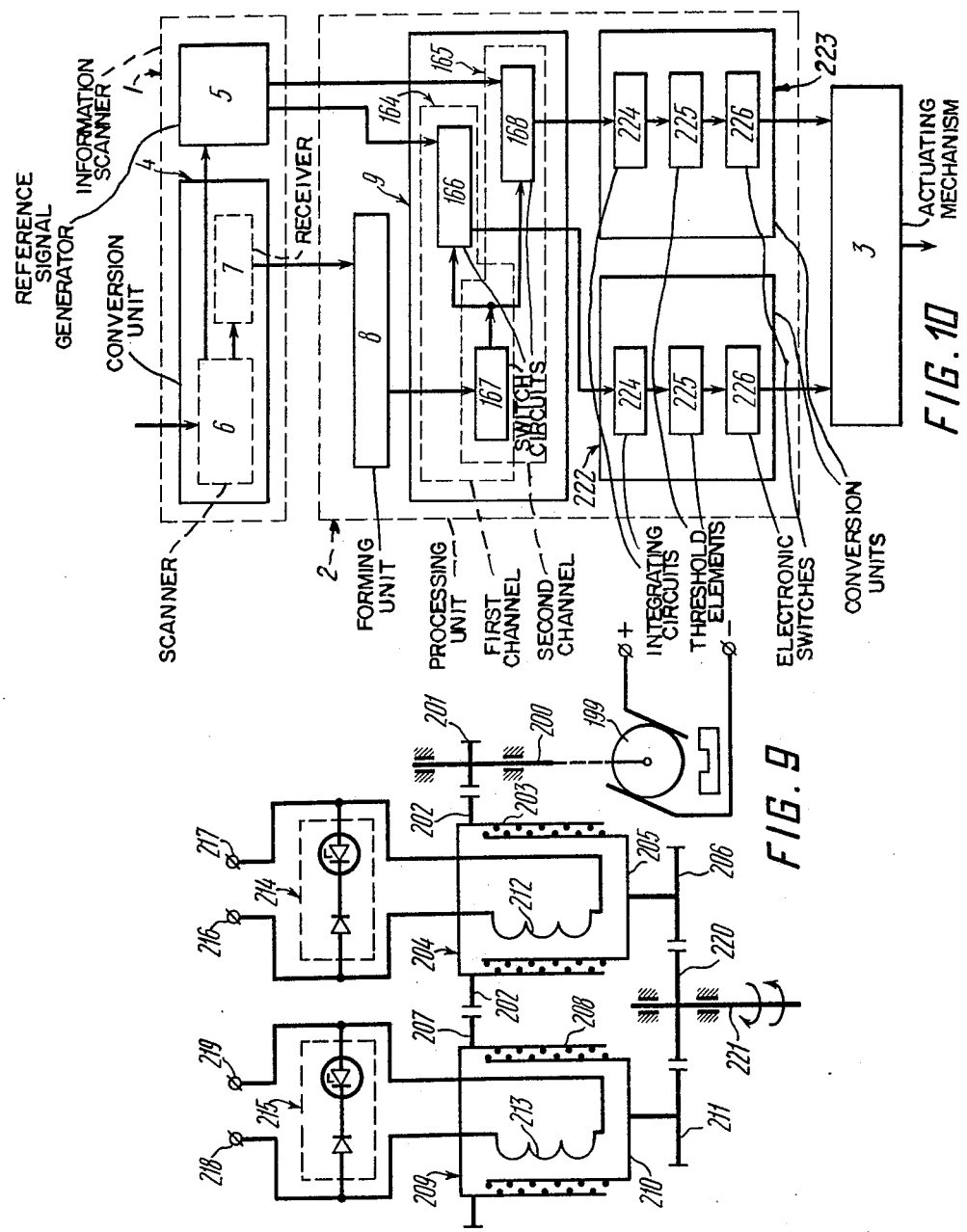

SYSTEM FOR AUTOMATIC CONTROL OF OBJECT BY CONTRAST PROGRAM

The present invention relates to automatic control systems for objects and, more particularly, the invention relates to systems for automatic control of an object by a contrast program.

This invention can be used in agricultural machinery for automatic steering of mobile objects on agricultural fields.

The invention can be used for automatic control of a part of an object, e.g. of a separate soil tilling implement.

The invention can also be used for automatic control of various mobile objects (e.g. transport vehicle, tractor, combine harvester, marking machine, etc.).

Some definitions of certain concepts and illustrating examples are given hereinafter.

A contrast formation is a formation on a portion of a surface having physical properties sufficiently different from the physical properties of the surface itself to allow for its identification by means of a radiation flux emanating from this surface and said formation.

A contrast program is a totality of the surface and contrast formation having admissible dimensions and shape and located on the surface in a specified direction.

Sometimes, it is allowable to consider the boundary dividing the contrast formation from the surface to be the contrast program, or the boundary dividing one part of the surface from another if their physical properties are different.

Contrast programs can be artificial and natural.

Artificial contrast programs are those where special substances (powder, granules, foam, etc.) or articles (strips, cables, float chains), which contrast the surface, are used as contrast formations.

Thus, an artificial contrast program on a surface, a road, a field or on water specifies a required path of motion of the object or a program to perform specified operations by a process implement.

Natural contrast programs are those which are naturally formed in the process of various technological operations. For example, in field husbandry a natural contrast program is formed when plowing the stubble of grains, which is the boundary between the treated and untreated parts of the surface. A row of plants or a row of mowed headed grains can also be a contrast program as well as the boundary between the mowed and unmowed regions of the field.

The natural contrast program obtained during the first run of a technological implement is used for further movement of the object, which is automatically controlled by this contrast program and forms a new contrast program. Each newly formed contrast program can be used for further automatically controlled passages of the object thus ensuring treatment of areas of any size.

An artificial contrast program is used in field husbandry in a similar manner, in which case it is sufficient to lay out the contrast program for the first run of the automatically controlled object which simultaneously lays out the articifial contrast program for the next run of this or a similar object.

In many cases one and the same contrast program (artificial or natural) can be used repeatedly for automatic control of one or several objects when they run along a permanent route. This is possible in transportation works proving ground tests of various objects and in some other cases.

A passive contrast program is that which can be detected only when excited by a radiation flux of an external source. Thus, natural contrast program formed in field husbandry are, as a rule, passive programs.

An active contrast program is such a contrast program, where the major part of the radiation from the source is produced by the material or the object of this contrast program.

Active contrast programs are, as a rule, artificial ones. Thus, a contrast program can be laid on a proving ground making use of a luminescent material or fluorescent tubes.

As a rule, each contrast program exists in a definite range of the wavelength of the radiation flux. The most common contrast programs are those detected in the visible-light and infrared ranges.

$Y_o$ is the specified transverse coordinate of the object from the contrast program.

$Y_t$ is the actual transverse coordinate of the object obtained due to the tracking movement of the latter. It is read from the base of the perpendicular, which is lowered on the surface from the point of installation of the information scanner on the given object.

$\Delta Y = (Y_t - Y_o)$ is the mismatch showing the deviation of the object from the specified position with respect to the contrast program.

The normal position of the object is that position with respect to the contrast program, when $\Delta Y = 0$.

The modern tendency in automation of various labor-consuming works such as in agriculture, transportation and civil engineering implies high quality of corresponding objects provided with automatic control, including high accuracy in performing specified operations and high reliability; furthermore increased requirements are imposed on the working capacity of each such object. The last requirement can to a great extent be satisfied by increasing the operating speed of the movable objects.

Automatic control of the motion of objects along a specified course and automatic control of the position of the working member on any carrier object is a promising direction in automation of laborious work. The necessity in automation of such works is based on the fact that the physiological capacities of a human operator are now a restricting factor in increasing the operating capacity of an object per shift, especially in the development of an object featuring very high capacity.

In many cases automatic control of the direction of motion of mobile objects or the position of the working members can be effected by different systems for automatic control by control programs, since the contrast programs either appear naturally or can be set up once for running a plurality of objects during a long term.

Most promising are such systems for automatic control by a contrast program, which are based on the principle of scanning the contrast program, since this principle allows the same system to be used with various contrast programs and, in addition, provides good possibilities for increasing the accuracy of control and the speed of response, which are necessary for increasing the operating speeds of the objects.

Known in the art is a system of automatic control of a wheeled tractor ensuring its direction by means of a contrast program based on the scanning principle. This system comprises an information scanner having a converter unit connected to a reference signal generator connected to a unit for processing the electrical signals having a signal forming unit and a switching device based on two flip-flops with electromagnetic relays. The outputs of the unit for processing the electrical signals in the form of the contacts of said electromagnetic relays are connected to an actuating mechanism acting on the tractor steering system.

In this system the switching device produces commands to control the actuating mechanism, in which case the commands for making right and left turns may be associated with the absence of commands during the movement of the tractor in a specified direction.

However, the speed of response of the known system is limited by the low speed or response of the electromagnetic relays of the switching device.

Furthermore, the reliability of the known system is limited by the low reliability of operation of the electromagnetic relays of the switching device, which are switched over by each new control signal.

The known system is also disadvantageous in that its reliability is restricted by spurious commands for right or left turns of the tractor in the case of discontinuities in the contrast program.

The latter occurs owing to the fact that, according to the principle of operation of the switching device, the electrical pulse carrying information on the contrast program must be produced during each operating cycle of the system. In the absence of such pulses the first flip-flop of the switching device is in such position, that a command for turning the tractor to the right or to the left is produced by means of the electromagnetic relay. This commands acts until a train of pulses carrying information on the contrast program is produced, said train having adequate duration. In this case the electromagnetic relay is switched over to its reverse position thus sending a command for turning the tractor to the opposite side — to the specified course. This is possible if the tractor is at such a distance from the contrast program, that it is still within the range of the surface being analyzed.

The known system is also disadvantageous in that its switching device provides only relay operating control and this reduces the accuracy of the system and limits its operating speed.

An object of the present invention is to provide a system for automatic control of an object by a contrast program.

Another object of the invention is to increase the accuracy of the system.

Still another object of the invention is to increase the operational reliability of the system.

These objects are achieved by a system for automatic control of an object by a contrast program comprising the following components connected in series: an information scanner producing electrical signals, whose combination carries information on the coordinate of the contrast program on the analyzed surface, having a device for conversion of a specified portion of a radiation flux into an electrical signal carrying information on the contrast program connected to a reference signal generator producing electrical signals carrying information on the scanning of the analyzed surface; a unit for processing the electrical signals carrying information on the contrast program and on the scanning of the analyzed surface including a unit for forming normalized electrical signals carrying information on the contrast program; and an actuating mechanism executing the commands to control the object. According to the invention, the unit for processing the electrical signals carrying information on the contrast program and on the scanning of the analyzed surface includes a logical circuit for processing the electrical signals carrying information on the contrast program and on the scanning of the analyzed surface, said logical circuit producing electrical signals carrying information on the deviation of the object from the specified position with respect to the contrast program and being electrically connected to said unit for forming normalized electrical signals, to said reference signal generator and to said actuating mechanism.

It is advisable that in the system according to the invention the logical circuit for processing the electrical signals carrying information on the contrast program and on the scanning of the analyzed surface is made in the form of a two-channel coincidence circuit, in which the separate marker inputs of the first and second channels are respectively the first and second marker inputs of the logical circuit for processing the electrical signals and are electrically connected to the reference signal generator and in which the common signal input is a signal input of the logical circuit for processing the electrical signals and is connected to the unit for forming normalized electrical signals; the outputs of the first and second channels of this two-channel coincidence circuit make up the outputs of the logical circuit for processing the electrical signals.

It is advisable that in the system according to the invention the unit for processing electrical signals includes two units for conversion of the electrical signals carrying information on the deviation of the object from a specified position with respect to the contrast program into electrical signals to control the actuating mechanism, each unit being electrically connected to the logical circuit for processing the electrical signals and to the actuating mechanism.

It is preferable, that in the system according to the invention each of the units, for conversion of the electrical signals carrying information on the deviation of the object from the specified direction with respect to the contrast program into electrical signals to control the actuating mechanism, comprises a network including an integrating circuit, a threshold element and an electronic switch connected in series, the input of the integrating circuit and the output of the electronic switch being respectively the input and output of each unit for conversion of electrical signals.

The present invention makes it possible to considerably increase the speed of response of the system. This is ensured by the fact that the system has no electromagnetic relays and the actuating mechanism is controlled directly by high-speed electronic elements.

Furthermore, the present invention provides high operational reliability of the system, i.e. its trouble-free operation. This is attained due to the fact that the signal processing unit has no electromagnetic relays with heavy-duty contact groups and the actuating mechanism is controlled by non-contract electronic elements.

The present invention also provides high dependability, i.e. stable operation of the system in the case of discontinuities in the contrast program. This is achieved due to the fact that the signal processing unit is provided with a logical circuit, which cannot produce a control signal in the absence of a signal carrying information on the contrast program.

Furthermore, the present invention increases the accuracy and operating speed of the system. This is achieved due to the fact that the logical circuit and conversion units employed in the proposed system have a high speed of response and ensure a linear condition for controlling the actuating mechanism of the system.

Other objects and advantages of the present invention will be apparent from the description of some embodiments thereof with reference to the accompanying drawings, in which:

FIG. 5 shows a block diagram of the system for automatic control of an object by a contrast program with a first embodiment of the logical signal processing circuit, according to the invention;

FIG. 6 is an electrical schematic diagram of the first embodiment of the logical signal processing circuit, according to the invention;

FIG. 7 shows a block diagram of the system for automatic control of an object by a contrast program with a second embodiment of the logical signal processing circuit, according to the invention;

FIG. 8 is an electrical schematic diagram of the second embodiment of the logical signal processing circuit, according to the invention;

FIG. 9 is an electrical schematic diagram of the actuating mechanism, according to the invention;

FIG. 10 shows a block diagram of the system for automatic control of an object by a contrast program with a second embodiment of the logical circuit for signal processing and of the conversion units, according to the invention;

Figure 1:
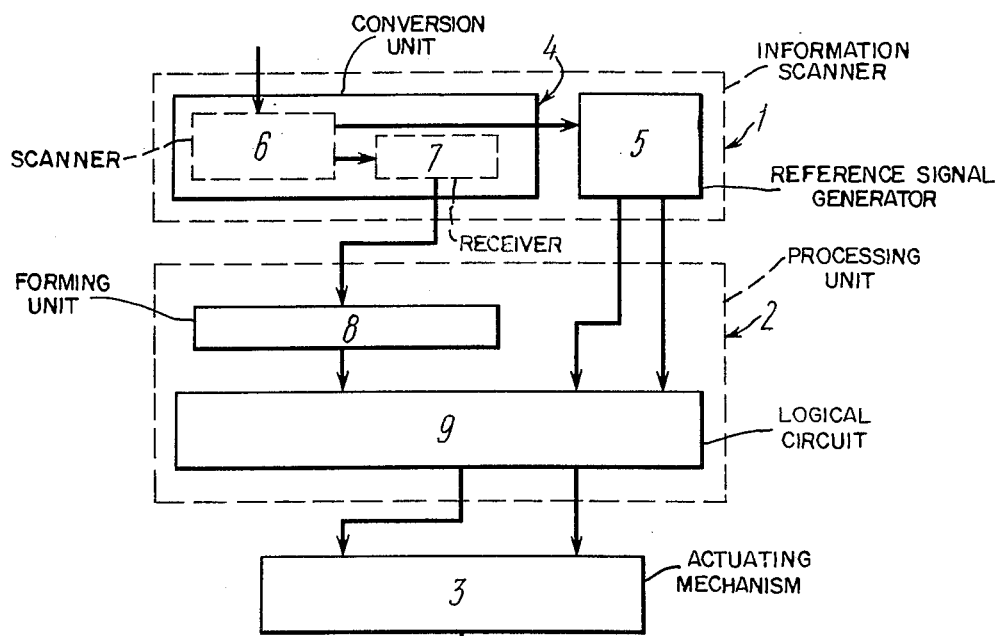
FIG. 1 shows a block diagram of the system for automatic control of an object by a contrast program, according to the invention.
Figure 16:
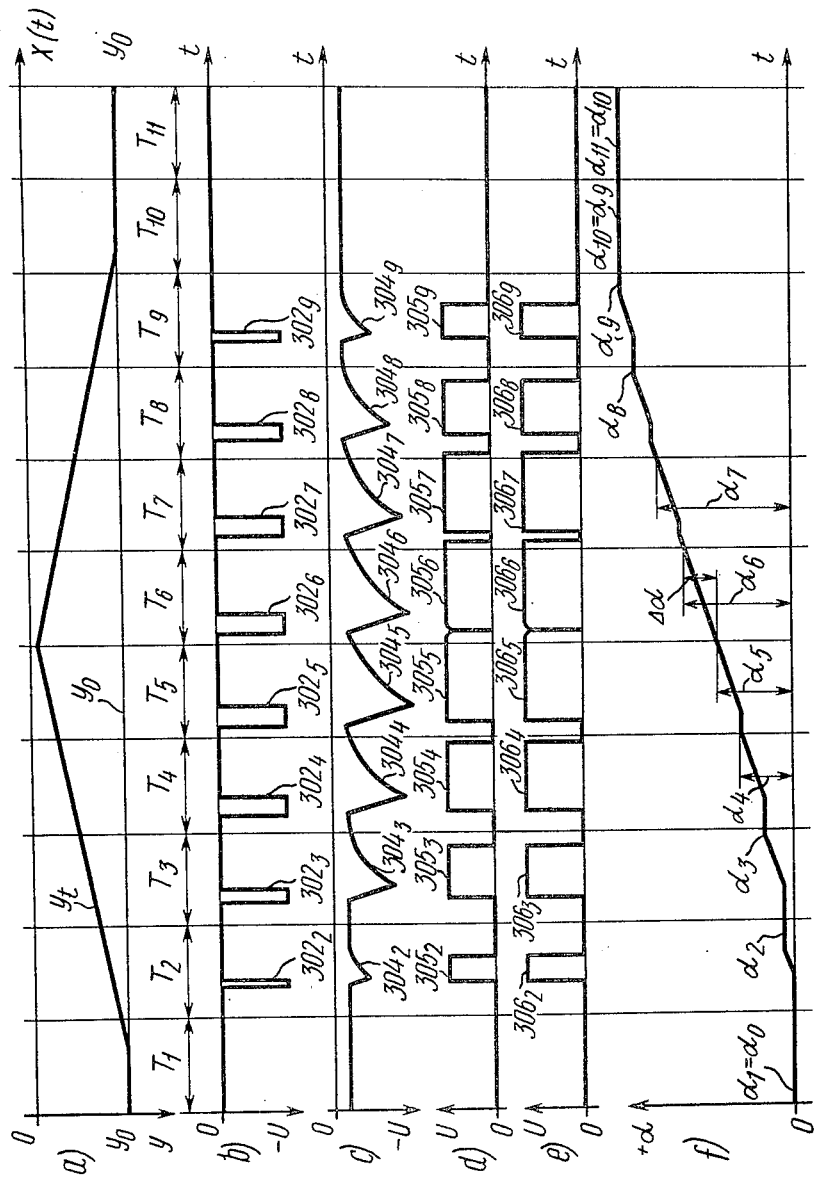

FIGS. 13b, c, d, e, f, g, h are time diagrams of the signals acting in the system shown in FIG. 1 at $Y_t = Y_o$, according to the invention;

FIG. 13i is a graph of the movement of the object along the contrast program at $Y_t = Y_o$, according to the invention;

FIG. 14a is a graph of the movement of the object along the contrast program in three typical cases of operation of the system, according to the invention;

FIGS. 14b, c, d are time diagrams of the signals acting at the inputs of the logical circuit, according to the invention;

FIGS. 14e, f are time diagrams of the signals acting at the outputs of the logical circuit, according to the invention;

FIG. 14g is a graph of the angular position of the output shaft of the actuating mechanism, according to the invention;

FIG. 15a is a graph of the movement of the object along a contrast program at $Y_t \neq Y_o$, according to the invention;

FIGS. 15b, c shows time diagrams of the signals acting at the inputs of the logical circuit, according to the invention;

FIG. 15d is a time diagram of the signals acting at the output of the logical circuit, according to the invention;

FIG. 15e is a graph of the angular position of the output shaft of the actuating mechanism, according to the invention;

FIG. 16a is a graph of the movement of the object along a contrast program at $Y_t \neq Y_o$, according to the invention;

FIG. 16b is a time diagram of the signals acting at the output of the logical circuit, according to the invention;

FIGS. 16c, d, e shows time diagrams of the signals acting in the conversion unit of the system shown in FIG. 10, according to the invention;

FIG. 16f is a graph of the angular position of the output shaft of the actuating mechanism, according to the invention;

FIG. 17a is a graph of the movement of the object along a contrast program, according to the invention;

FIGS. 17b, c, d shows time diagrams of the signals acting at the inputs of the logical circuit of the system made as shown in FIG. 10 and adjusted for operation under relay conditions, according to the invention;

FIGS. 17e, f are time diagrams of the signals acting at the outputs of the logical circuit of the system made as shown in FIG. 10 and adjusted for operation under relay conditions, according to the invention;

FIGS. 17g, h, i, j, k, l are time diagrams of the signals acting in the conversion units of the system shown in FIG. 10, according to the invention; and FIG. 17m is a graph of the angular position of the output shaft of the actuating mechanism according to the invention.

The system for automatic control by a contrast program includes the following components connected in series: an information scanner 1 (FIG. 1) producing electrical signals whose combination carries information on the contrast program coordinate on the analyzed surface, a unit 2 for processing the electrical signals carrying information on the contrast program and on the scanning of the analyzed surface and an actuating mechanism 3 executing the commands to control the object. Thus, the input of the device 1 is the input of the system for automatic control of an object by a contrast program, and the output of the actuating mechanism 3 is the output of this system.

The information scanner 1 comprises a device 4 for conversion of a specified portion of the radiation flux into an electrical signal carrying information on the contrast program and a reference signal generator 5 producing electrical signals carrying information on the scanning of the analyzed surface, said devices being connected to each other, the input of the device 4 being the input of the device 1.

The conversion device 4 comprises a scanner 6, whose input serves as the input of the device 4, and a receiver 7 converting the radiation flux, applied to its input from one of the outputs of the scanner 6, into an electric signal. The other output of the scanner 6 is connected to the generator 5.

The device 1 has three outputs; its signal output is the output of the receiver 7 and its two marker outputs are the outputs of the generator 5.

The unit 2 has a unit 8 for forming normalized electrical signals carrying information on the contrast program, whose input, serving as a signal input of the unit 2, is connected to the signal output of the device 1 and, according to the invention, a logical circuit 9 for processing the electrical signals carrying information on the contrast program and on the scanning of the analyzed surface producing electrical signals carrying information on the deviation of the object from the specified position with respect to the contrast program. The signal input of the logical circuit 9 is connected to the output of the unit 8, and its two marker inputs serving as marker inputs of the unit 2 are connected to the corresponding marker outputs of the device 1. The outputs of the logical circuit 9 serve as outputs of the unit 2 and are connected to the inputs of the actuating mechanism 3.

Figure 2:
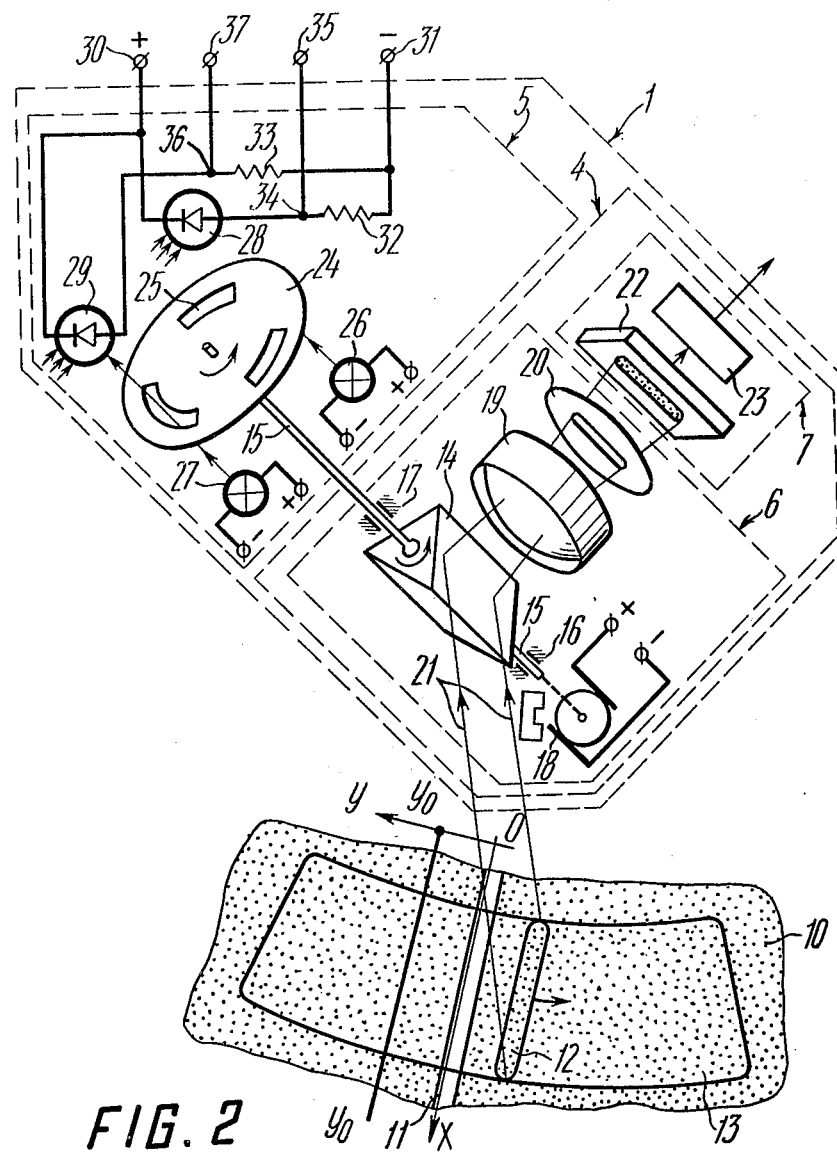
FIG. 2 is a working diagram of the information scanner, according to the invention.

FIG. 2 shows a road surface 10, e.g. a surface having a dark asphalt coating. The surface 10 has a contrast program 11 formed by a boundary (left-hand in the drawing) of the contrast formation. This boundary can be formed, for example, by a longitudinal marking strip of a white color and can be located within the range of visibility of the device 1. The analyzed surface 13 is shown on the surface 10 when shifting the perceptible surface 12. The perceptible surface 12 and the analyzed surface 13 are shown conventionally along the perimeter.

The trajectory of the contrast program 11 specifies a path of movement of the object (not shown). The coordinate axis $O_x$ lying on the contrast program 11 is a direction specified by this contrast program 11.

The transverse coordinate axis $O_y$ shows a distance (in the transverse direction) from the contrast program 11 to the object from left to right starting from the object. $Y_o$ is a specified transverse coordinate of the object from the contrast program 11. The direction of the line $Y_O — Y_o$ follows exactly the direction of this contrast program 11 including the curved portion of the X latter. The coordinate axis $O_x$ and, therefore, the line $Y_o — Y_o$ are shown in the drawings given below.

The scanner 6 comprises a mirror trigonal prism 14 installed on an axle 15 mounted in bearings 16 and 17 and rotated by an electric motor 18 setting up a direction of rotation and a required angular velocity. Mounted near the prism 14 is an objective 19 followed by a diaphragm 20 located on the path of light rays and serving as an output element of the scanner 6.

The construction of the scanner 6, the distance from the scanner to the surface 10 and the size of the working apertures of the diaphragm 20 determine the shape and size of the portion of the surface 13 being analyzed during the process of scanning (per operating cycle), from which the specified portion of the light flux 21 of the total radiation flux emitted by the surface 10 to the device 1 is received. It is this portion, which is received by the surface 12.

A diaphragm 20 mounted approximately in the local plane of the objective 19 is an output element of the scanner 6, while the light flux passed through the working aperture of this diaphragm 20 is an output signal (the specified portion of the radiation flux) of the scanner 6.

Located in the immediate vicinity of the scanner 6 and rigidly connected thereto is a receiver 7 converting the radiation flux, applied to its input from the output of the scanner 6, into a primary electrical signal. The receiver 7 is provided with a light-sensitive element in the form of a photodiode 22, shown in a simplified form in the drawing, and a power supply element feeding the photodiode 22 and making it possible to produce a primary electrical signal carrying information on the analyzed surface 13. This element consists of a resistor 23 shown conventionally in the drawing.

Located near the scanner 6 is a reference signal generator 5 producing electrical signals carrying information on the scanning of the analyzed surface. The generator 5 is connected to the scanner 6 by the rotating axle 15.

The generator 5 comprises a marker disk 24 made of an opaque material (e.g. of metal) having three identical slotted apertures 25 of a specified size and arranged uniformly on a given diameter.

The disk 24 is rigidly connected to the shaft 15. The incandescent lamps 26 and 27 connected to a power supply source (not shown) are located at one side of the disk 24. Photodiodes 28 and 29 are located at the other side of the disk 24 so that the light fluxes from the incandescent lamps 26 and 27 fall respectively onto the photodiodes 28 and 29 only through that aperture 25, which is between the corresponding lamps 26 and 27 and the photodiodes 28 and 29. The cathodes of both photodiodes 28 and 29 are connected to a terminal 30, which, in turn, is connected to the positive terminal of a d-c power supply source (not shown) whose negative terminal is connected to a terminal 31. The first leads of resistors 32 and 33 are connected to the terminal 31. The second lead of the resistor 32 and the anode of the photodiode 28 are interconnected in at a junction point 34 and are connected to a terminal 35 and this circuit makes up a marker output of the generator 5.

The second lead of the resistor 33 and the anode of the photodiode 29 are interconnected at a junction point 36 and are connected to a terminal 37 making up the second marker output of the generator 5.

Figure 3:
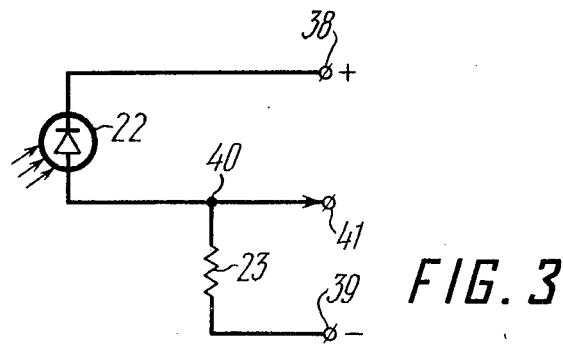
FIG. 3 is an electrical schematic diagram of the receiver, according to the invention.

FIG. 3 is an electrical schematic diagram of the receiver 7 (FIGS. 1, 2). The cathode of the photodiode 22 (FIG. 3) is connected to a terminal 38, which is fed with voltage having a positive polarity with respect to a terminal 39 connected to one lead of the resistor 23. The anode of the photodiode 22 and the second lead of the resistor 23 are interconnected at a junction point 40 and the junction is connected to a terminal 41 serving as an output of the receiver 7 and as an output of the device 1 (FIGS. 1, 2).

Figure 4:
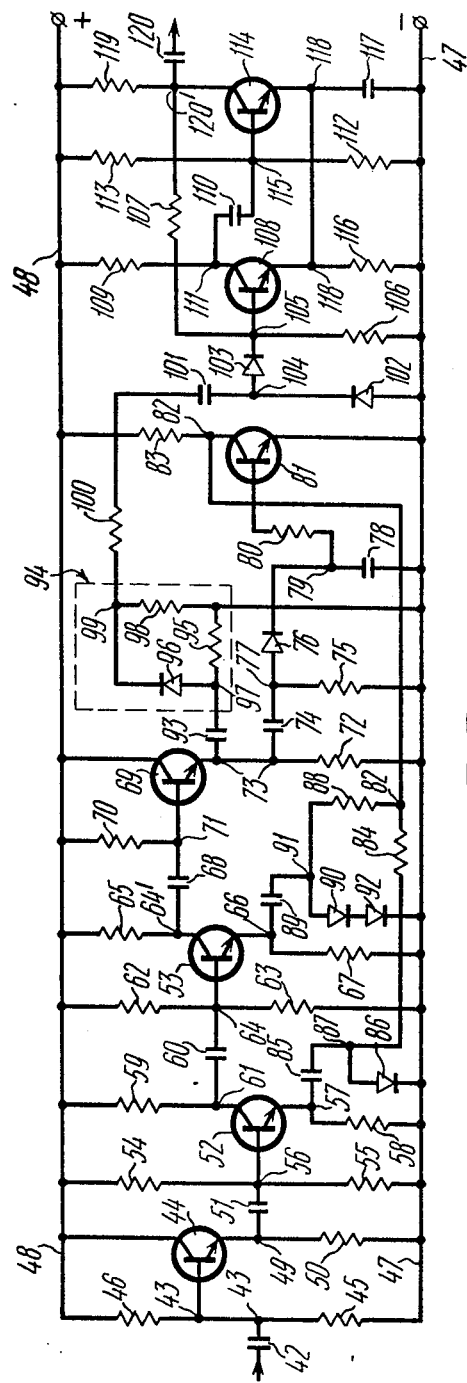
FIG. 4 is an electrical schematic diagram of the signal forming unit, according to the invention.

FIG. 4 is an electrical schematic diagram of the unit 8 for forming electrical signals carrying information on the contrast program 11 (FIG. 2).

The output of the receiver 7 through the terminal 41 (FIG. 3) is connected to the first lead of a capacitor 42 (FIG. 4) serving as a signal input of the unit 8 (FIG. 1). The other lead of the capacitor 42 (FIG. 4) is connected to the base of a transistor 44 and to first leads of resistors 45 and 46 at a junction point 43. The second lead of the resistor 45 is connected to a zero busbar 47, and the second lead of the resistor 46 is connected to a busbar 48, which is fed with voltage of a positive polarity with respect to the zero busbar 47. The collector of the transistor 44 is connected to the busbar 48; the emitter of the transistor 44 is connected to the first lead of a resistor 50 at a junction point 49 and the second lead of the resistor 50 is connected to the zero busbar 47. The transistor 44 with the elements 42, 45, 46 and 50 is an emitter follower, which is a current amplifier amplifying the signal produced by the receiver 7 (FIG. 3). The emitter of the transistor 44 (FIG. 4) serving as an output of the emitter follower is connected through the junction 49 by means of a capacitor 51 to the input of a two-stage a-c voltage amplifier based on transistors 52 and 53. The base of the transistor 52 and the first leads of the resistors 54 and 55 are interconnected at a junction point 56 and make up the input of the two-stage amplifier. The second lead of the resistor 54 is connected to the busbar 48, and the second lead of the resistor 55 is connected to the zero busbar 47. The emitter of the transistor 52 through a junction 57 and a resistor 58 is connected to the zero busbar 47. The collector of the transistor 52 is connected to a resistor 59 and to the first lead of a capacitor 60 at a junction point 61. The second lead of the resistor 59 is connected to the busbar 48. The second lead of the capacitor 60, the base of the transistor 53 and the first leads of resistors 62 and 63 are interconnected at a junction point 64. The second lead of the resistor 63 is connected to the zero busbar 47, and the second lead of the resistor 62 is connected to the busbar 48. The collector of the transistor 53 through the junction point 64' and a resistor 65 is connected to the busbar 48. The emitter of the transistor 53 is connected to the zero busbar 47 through a junction point 66 and a resistor 67. The collector of the transistor 53 makes up the output of the two-stage a-c voltage amplifier, which is connected to the input of an emitter follower through a capacitor 68. The emitter follower is formed by connecting the base of a transistor 69 and the first lead of a resistor 70 at a junction point 71. The emitter of the transistor 69 and a first lead of the resistor 72 are connected together at a junction point 73 and serve as an output of the emitter follower. The collector of the transistor 69 and the second lead of the resistor 70 are connected to the busbar 48. The second lead of resistor 72 is connected to the zero busbar 47. Connected to the output of the emitter follower at the point 73 through a capacitor 74 is an input of an integrating circuit formed by connection of one lead of the resistor 75 and the anode of a diode 76 at a junction point 77. The output of the integrating circuit is formed by connection of the cathode of the diode 76 and the first lead of the integrating capacitor 78 at a junction point 79. The other lead of the resistor 75 and the second lead of the integrating capacitor 78 are connected to the zero busbar 47. The base of an amplifying transistor 81 is connected to the output of the integrating circuit at the junction point 79 through a resistor 80. The emitter of the transistor 81 is connected to the zero busbar 47. The collector of the transistor 81 through a junction point 82 and a resistor 83 is connected to the busbar 48 and makes up the output of the amplifier. The first lead of a resistor 84 is connected to the collector of the transistor 81 at the point 82. The second lead of the resistor 84, the first lead of a capacitor 85 and the anode of a diode 86 are interconnected at a junction point 87. The second lead of the capacitor 85 is connected to the emitter of the transistor 52 at the point 57. The cathode of the diode 86 is connected to the zero busbar 47. In addition, the first lead of a resistor 88 is connected to the collector of the transistor 81 at the point 82. The second lead of the resistor 88, the first lead of a capacitor 89 and the anode of a diode 90 are connected together at a junction point 91. The second lead of the capacitor 89 is connected to the emitter of the transistor 53 at the junction point 66.

The cathode of the diode 90 is connected to the anode of a diode 92 whose cathode is connected to the zero busbar 47. Connected to the junction 73 through a capacitor 93 is an input of an amplitude selector 94, which is formed by connection of the first lead of a resistor 95 and the anode of a diode 96 at a junction point 97. The second lead of the resistor 95 is connected to the zero busbar 47. The output of the amplitude selector 94 is formed by connection of the cathode of the diode 96 with one lead of a resistor 98 at a junction point 99. The other lead of the resistor 98 is connected to the zero busbar 47. Connected to the output of the amplitude selector 94 at a point 99 is a first lead of a resistor 100 whose second lead is connected to the first lead of a capacitor 101. The second lead of the capacitor 101, the cathode of a diode 102 and the anode of a diode 103 are connected together at a junction point 104. The anode of the diode 102 is connected to the zero busbar 47. The cathode of the diode 103 is connected at a junction point 105 to the first leads of the resistors 106, 107 and to the base of a transistor 108 which form an input of a driven multivibrator. The second lead of the resistor 106 is connected to the zero busbar 47. The collector of a transistor 108, the first lead of a resistor 109 and the first lead of a capacitor 110 are connected together at a junction point 111. The second lead of the resistor 109 is connected to the busbar 48. The second lead of the capacitor 110, the first leads of resistors 112 and 113 and the base of the second transistor of the driven multivibrator are connected together at a junction point 115. The second lead of the resistor 112 is connected to the zero busbar 47, and the second lead of the resistor 113 is connected to the busbar 48. The emitters of the transistors 108 and 114 and the first leads of a resistor 116 and a capacitor 117 are interconnected at a junction point 118. The second leads of the resistor 116 and capacitor 117 are connected to the zero busbar 47. The collector of the transistor 114, the second lead of the resistor 107, the first lead of a resistor 119, and the first lead of a capacitor 120 are connected together at a junction point 120'. The second lead of the capacitor 120 is an output of the driven multivibrator and serves as a signal output of the unit 8.

In the system for automatic control of an object by a contrast program 11 (FIG. 2), the logical circuit 9 (FIG. 1) for processing the electrical signals carrying information on the contrast program 11 (FIG. 2) and on the scanning of the analyzed surface is made in the form of a two-channel coincidence circuit, according to a first embodiment, comprising two independent channels 121 and 122 (FIG. 5). The first channel 121 includes two switch circuits 123 and 124 connected to each other, and the second channel 122 includes two circuits 125 and 126 connected to each other. The inputs of the switch circuits 123 and 125 are interconnected and serve as a common signal input for the channels 121 and 122 making up the signal input of the logical circuit 9 (FIGS. 1, 5).

The second separate inputs of the channels 121 and 122 (FIG. 5) are marker inputs, the marker input of the first channel 121 being an input of the switch circuit 124, which is the first marker input of the logical circuit 9 (FIGS. 1, 5). The marker input of the second channel 122 (FIG. 5) is an input of the switch circuit 126 and serves as the second marker input of the logical circuit 9 (FIGS. 1, 5). The output of the first channel 121 (FIG. 5) is an output of the switch circuit 124, which makes up the second output of the logical circuit 9 (FIGS. 1, 5).

FIG. 6 is an electrical schematic diagram of the first embodiment of the logical circuit 9 (FIGS. 1, 5).

The first channel 121 (FIG. 6) is built around transistors 127 and 128, the transistor 127 being the main component of the switch circuit 123 (FIG. 5) and the transistor 128 being the main component of the switch circuit 124 (FIG. 5). The second channel 122 (FIG. 6) is built around transistors 129 and 130, the former being a basic component of the switch circuit 125 (FIG. 5) and the latter being a basic component of the switch 126 (FIG. 5). The first lead of a capacitor 131 (FIG. 6) is connected to a terminal 132, makes up the marker input of the first channel 121 (FIG. 5) and serves as a first marker input of the logical circuit 9 (FIG. 5). The terminal 132 (FIG. 6) is connected to the first output of the generator 5 (FIG. 2) and to the terminal 35. The second lead of the capacitor 131 (FIG. 6) is connected to the first leads of the resistors 134 and 135 and to the base of the transistor 128 at a junction point 133. The second lead of the resistor 135, the emitter of the transistor 128 and the collector of the transistor 127 are interconnected at a junction point 136. The emitter of the transistor 127 is connected to the zero busbar 137. The second lead of the resistor 134 is connected to a busbar 138, which is supplied with a voltage having negative polarity with respect to the zero busbar 137. The base of the transistor 127 is connected at a junction point 139 to the first lead of a resistor 140, whose second lead is connected to the zero busbar 137, to the first lead of a resistor 141, whose second lead is connected to the busbar 138, and to the first lead of a capacitor 142, whose second lead is the input of the switch circuit 123 (FIG. 5) and makes up the signal input of the first channel 121 (FIGS. 5, 6). The collector of the transistor 128 (FIG. 6) is connected at a junction point 143 to the first lead of a resistor 144, whose second lead is connected to a busbar 145 fed with voltage of positive polarity with respect to the zero busbar 137. Furthermore, the collector of the transistor 128 is connected at the point 143 to the first lead of a capacitor 146 whose second lead is the output of the first channel 121 (FIGS. 5, 6) and is connected to the terminal 147 (FIG. 6). The second channel 122 (FIGS. 5, 6) is identical to the first channel 121. The first lead of a capacitor 148 (FIG. 6) connected to a terminal 149 is the marker input of the second channel 122 (FIGS. 5, 6) and serves as the second marker input of the logical circuit 9 (FIGS. 1, 5, 6). The terminal 149 is connected to the second marker output of the generator 5 (FIG. 2) at the terminal 37. The second output of the capacitor 148 (FIG. 6) is connected at a junction point 150 to the base of the transistor 130 and to the first lead of a resistor 151, whose second lead is connected to the busbar 138, and to the first lead of a resistor 152. The second lead of the resistor 152 is connected at a point 153 to the junction between the emitter of the transistor 130 and the collector of the transistor 129.

The emitter of the transistor 129 is connected to the zero busbar 137. The base of the transistor 129 is connected at a junction point 154 to the first lead of the resistor 155, whose second lead is connected to the zero busbar 137, to the first lead of a resistor 156, whose second lead is connected to the busbar 138, and to the first lead of a capacitor 157, whose second lead is the input of the switch circuit 125 (FIG. 5) and serves as a signal input of the second channel 122 (FIGS. 5, 6). The collector of the transistor 130 (FIG. 6) is connected at a junction point 158 to the first lead of a resistor 159, whose second lead is conncted to the busbar 145, and to the first lead of a capacitor 160 whose second lead makes up the output of the second channel 122 (FIGS. 5, 6) and is also connected to a terminal 161 (FIG. 6). The second lead of the capacitor 142, which makes up the input of the switch circuit 123 (FIG. 5) and serves as a signal input of the first channel 121 (FIGS. 5, 6), is connected at a junction point 162 (FIG. 6) to the input of the switch circuit 125 (FIG. 5) and makes up the signal input of the second channel 122 (FIGS. 5, 6). A terminal 163 (FIG. 6) is connected to a junction 162 (FIG. 6), which is a junction point for the second leads of the capacitors 142 and 157 making up the signal inputs of the first channel 121 (FIGS. 5, 6) and the second channel 122, respectively, and serving as a common signal input of the logical circuit 9 (FIGS. 1, 5, 6). The terminal 163 is connected to the signal output of the unit 8 (FIGS. 4, 5).

In the system for automatic control of an object by a contrast program 11 (FIG. 2), the logical circuit 9 (FIG. 1) for processing the electrical signals carrying information on the contrast program 11 (FIG. 2) and on the scanning of the analyzed surface 13 is made in the form of a two-channel coincidence circuit, according to the second embodiment of the invention, and comprises two interconnected channels 164 and 165 (FIG. 7). These channels 164 and 165 are based on three switch circuits 166, 167 and 168. The switch circuit 166 is included into the first channel, the switch circuit 168 is included into the second channel 165, while the switch circuit 167 is common to both channels 164 and 165 and is connected to switch circuits 166 and 168. The input of the switch circuit 167 makes up the common signal input of the channels 164 and 165 and serves as the signal input of the logical circuit 9 (FIGS. 1, 7). The second separate inputs of the channels 164 and 165 (FIG. 7) are marker inputs, the marker input of the first channel 164 being made up by an input of the switch circuit 166, which serves as a first marker input of the logical circuit 9 (FIGS. 1, 7). The marker input of the second channel 165 (FIG. 7) is constituted by an input of a switch circuit 168, which also serves as the second marker input of the logical circuit 9 (FIGS. 1, 7). The output of the first channel 164 (FIG. 7) is constituted by the output of the switch circuit 166, which also serves as the first output of the logical circuit 9 (FIGS. 1, 7), and the output of the second channel 165 (FIG. 7) is constituted by the output of the switch circuit 168, which serves as the second output of the logical circuit 9 (FIGS. 1, 7).

FIG. 8 is an electrical schematic diagram of the second embodiment of the logical circuit 9 (FIGS. 1, 7).

The switch circuit 166 (FIG. 7) is built around a transistor 169 (FIG. 8), the switch circuit 167 (FIG. 7) is built around a transistor 170 (FIG. 8), and the switch circuit 168 (FIG. 7) is build around a transistor 171 (FIG. 8). The first lead of a capacitor 172 is connected to a terminal 173, is a marker input of the first channel 164 (FIGS. 7, 8) and serves as a first marker input of the logical circuit 9 (FIGS. 1, 7, 8). The terminal 173 (FIG. 8) is connected to the first marker output of the generator 5 (FIG. 2) and to the terminal 35. The second lead of the capacitor 172 (FIG. 8) is connected at a junction point 174 to the first leads of resistors 175 and 176 and to the base of the transistor 169. The lead of the resistor 176, the emitter of the transistor 169 and the collector of the transistor 170 are connected together at a junction point 177. The emitter of the transistor 170 is connected to a zero busbar 178. The second lead of the resistor 175 is connected to a busbar 179 which is fed with voltage of negative polarity with a respect to the zero busbar 178. The base of the transistor 170 is connected at junction point 180 to the first lead of a resistor 181, whose first lead is connected to the zero busbar 178, to the second lead of the resistor 182, whose first lead is connected to the busbar 179, and to the first lead of a capacitor 183. The second lead of the capacitor 183 is connected to a terminal 184, is an input of the switch circuit 167 (FIGS. 7, 8) and serves as the signal input of the logical circuit 9 (FIG. 7).

The terminal 184 (FIG. 8) is connected to the signal output of the unit 8 (FIGS. 4, 7). The emitter of the transistor 171 and the first lead of a resistor 185 are connected at the junction point 177 (FIG. 8). The base of the transistor 171 is connected at a junction point 186 to the second lead of the resistor 185, to the first lead of a resistor 187, whose second lead is connected to the busbar 179, and to the first lead of a capacitor 188. The second lead of the capacitor 188 is connected to a terminal 189, makes up the marker input of the second channel 165 (FIGS. 7, 8) and serves as the second marker input of the logical circuit 9 (FIGS. 1, 7, 8). The terminal 189 (FIG. 8) is connected to the second marker output of the generator 5 (FIG. 2) and to the terminal 37. The collector of the transistor 169 (FIG. 8) is connected at a junction point 190 to the first lead of a resistor 191, whose second lead is connected to a busbar 192, which is fed with voltage of a positive polarity with respect to the zero busbar 178, and to the first lead of a capacitor 193. The second lead of the capacitor 193 makes up the output of the first channel 164 (FIGS. 7, 8) and is connected to a terminal 194 (FIG. 8). The collector of the transistor 171 is connected at a junction point 195 to the first lead of a resistor 196, whose second lead is connected to the busbar 192 and to the first lead of a capacitor 197, whose second lead makes up the output of the second channel 165 (FIGS. 7, 8) and is connected to a terminal 198 (FIG. 8).

The actuating mechanism 3 (FIGS. 1, 5, 7) executing the commands to control the object comprises a drive electric motor 199 (FIG. 9) connected to a power supply source (not shown). Rigidly mounted on the shaft 200 of the drive motor 199 is a gear wheel 201. The gear wheel 201 is coupled to a gear wheel 202 secured on the driving part 203 of a powdery electromagnetic coupling 204. The latter has a driven part 205 carrying a gear wheel 206 rigidly mounted thereon. The gear wheel 202 is coupled to a gear wheel 207 secured on the driving part 208 of another powdery electromagnetic clutch 209. Rigidly secured on the shaft of the driven part 210 of the coupling 210 is a gear wheel 211. The couplings 204 and 209 have control windings 212 and 213, respectively, connected in parallel to forcing circuits 214 and 215 respectively. Each forcing circuit 214 and 215 comprises a diode and a voltage stabilizer connected in series. The leads of the winding 212 of the coupling 204 are connected to terminals 216 and 217 and make up the first input of the actuating mechanism 3 (FIGS. 1, 2, 7), and the leads of the winding 213 (FIG. 9) of the coupling 209 are connected to terminals 218 and 219 and make up the second input of the actuating mechanism 3 (FIGS. 1, 5, 7).

The gear wheels 206 and 211 (FIG. 9) are coupled to a gear wheel 220 rigidly mounted on an output shaft 221. The output shaft 221 of the actuating mechanism 3 (FIGS. 1, 5, 7) is connected through a geared couple to the object being controlled.

The electrical connection of the logical circuit 9 (FIG. 5 or FIG. 7) with the inputs of the actuating mechanism 3 (FIG. 9) is made as follows. The terminal of the zero busbar 137 (FIG. 6) of the first embodiment of the logical circuit 9 (FIG. 5), as well as the terminal of the zero busbar 178 (FIG. 8) of the second embodiment of the logical circuit 9 (FIG. 7), is connected to the terminals 217 and 219 (FIG. 9) of the actuating mechanism 3. The terminal 147 (FIG. 6) of the first embodiment of the logical circuit 9 (FIG. 5), as well as the terminal 194 (FIG. 8) of the second embodiment of the logical circuit 9 (FIG. 7), is connected to the terminal 216 (FIG. 9) of the actuating mechanism 3. The terminal 161 (FIG. 6) of the first embodiment of the logical circuit 9 (FIG. 5), as well as the terminal 198 (FIG. 8) of the second embodiment of the logical circuit 9 (FIG. 7), is connected to the terminal 218 (FIG. 9) of the actuating mechanism 3.

FIG. 10 shows a block diagram of the system for automatic control of an object by a contrast program 11 (FIG. 2), in which the logical circuit 9 (FIGS. 7, 8) according to the second embodiment is used as a logical circuit (FIG. 1) and which, according to the invention, includes two units 222 and 223 (FIG. 10) for conversion of the electrical signals carrying information on the deviation of the object from a specified position with respect to the contrast program 11 (FIG. 2) into electrical signals controlling the actuating mechanism 3 (FIG. 10).

Each of the conversion units 222 and 223 comprises an integrating circuit 224, a threshold element 225 and an electronic switch 226 connected in series. The input of the first unit 222, which is formed by the input of its integrating circuit 224, is connected to the output of the first channel 164, i.e. to the first output of the logical circuit 9, and the input of the second unit 223, which is constituted by the input of its integrating circuit 224, is connected to the output of the second channel 165, i.e. to the second output of the logical circuit 9.

The output of the first unit 222, which is constituted by the output of its electronic switch 226, serves as a first output of the signal processing unit 2 and is connected to the first input of the actuating mechanism 3. The output of the second unit 223, constituted by the output of its electronic switch 226, serves as a second output of the signal processing unit 2 and is connected to the second input of the actuating mechanism 3.

Figure 11:
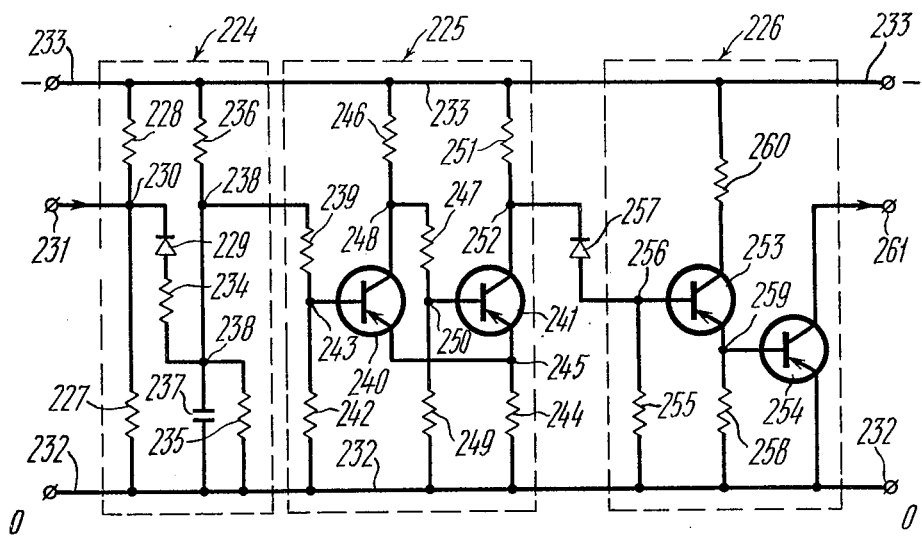
FIG. 11 is an electrical schematic diagram of the first embodiment of the conversion units, according to the invention.

FIG. 11 is an electrical schematic diagram of the first embodiment of the conversion units 222 and 223 (FIG. 10). The first leads of the resistors 227 and 228 (FIG. 11) and the cathode of the diode 229 are connected together at a junction point 230, make up the input of the integrating circuit 224, connected to the terminal 231, and serve as the input of the unit 222 (223) (FIG. 10). The second lead of the resistor 227 is connected to a zero busbar 232. The second lead of the resistor 228 is connected to a busbar 233 which is fed with a voltage of negative polarity with respect to the busbar 232.

The anode of the diode 229 is connected to the first lead of a resistor 234. The second lead of the resistor 234, the first leads of resistors 235 and 236 and of capacitor 237 are interconnected at a junction point 238 and make up the output of the integrating circuit 224 (FIGS. 10, 11). The second leads of the resistor 235 (FIG. 11) and capacitor 237 are connected to the zero busbar 232. The second lead of the resistor 236 is connected to the busbar 233.

Connected to the output of the integrating circuit 224 at the junction point 238 is the first lead of the resistor 239, which serves as an input of the threshold element 225 (FIGS. 10, 11). The threshold element 225 (FIG. 11) is built around transistors 240 and 241. The base of the transistor 240, the second lead of the resistor 239 and the first lead of the resistor 242 are connected together at a junction point 243. The second lead of the resistor 242 is connected to the zero busbar 232. The emitters of the transistors 240 and 241 and the first lead of the resistor 244 are connected together at a junction point 245. The second lead of the resistor 244 is connected to the zero busbar 232. The collector of the transistor 240 and the first leads of the resistors 246 and 247 are connected together at a junction point 248. The second lead of the resistor 246 is connected to the busbar 233. The base of the transistor 241, the second lead of the resistor 247 and the first lead of a resistor 249 are connected together at a junction point 250. The collector of the transistor 241 and the first lead of a resistor 251 are interconnected at a junction point 252 and make up the output of the threshold element 225 (FIG. 10, 11). The second lead of the resistor 251 (FIG. 11) is connected to the busbar 233. The electronic switch 226 (FIGS. 10, 11) is built around transistors 253 and 254 (FIG. 11). The base of a transistor 253 and the first lead of the resistor 255 are connected together at a junction point 256, make up the input of the electronic switch 226 (FIGS. 10, 11), and are connected to the output of the threshold element 225 at the point 252 (FIG. 11) through a diode 257 whose cathode is connected to the junction 252 and whose anode is connected to the junction 256. The second lead of the resistor 255 is connected to the zero busbar 232. The emitter of the transistor 253, the base of the transistor 254 and the first lead of a resistor 258 are connected together at a junction point 259. The second lead of the resistor 258 and the emitter of the transistor 254 are connected to the zero busbar 232. The collector of the transistor 254 is connected to a terminal 261 and makes up the output of the electronic switch 226 (FIGS. 10, 11) and the output of the conversion unit 222 (223) (FIG. 10).

Figure 12:
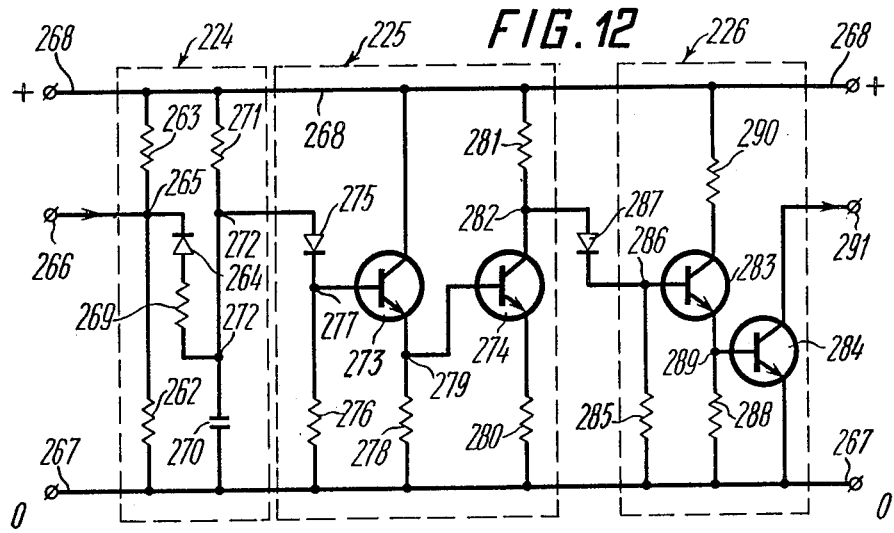
FIG. 12 is an electrical schematic diagram of the second embodiment of the conversion units, according to the invention.

FIG. 12 shows a key diagram of the second embodiment of the conversion units 222 and 223 (FIG. 10). The first leads of resistors 262 and 263 (FIG. 12) and the cathode of a diode 264 are interconnected at a junction point 265, make up the input of the integrating circuit 224 (FIGS. 10, 12) and, when connected to a terminal 266 (FIG. 12), make up the input of the conversion unit 222 (223) (FIG. 10). The second lead of the resistor 262 (FIG. 12) is connected to the a neutral busbar 267. The second lead of the resistor 263 is connected to a busbar 268, which is fed with a voltage of positive polarity with respect to the zero busbar 267. The anode of the diode 264 is connected to the first lead of the resistor 269. The second lead of the resistor 269, the first leads of the capacitor 270 and resistor 271 are connected together at a junction point 272 and make up the output of the integrating circuit 224 (FIGS. 10, 12). The second lead of the capacitor 270 (FIG. 12) is connected to the zero busbar 267, and the second lead of the resistor 271 is connected to the busbar 268.

The threshold element 225 is built around transistors 273 and 274 (FIG. 12). The anode of a diode 275 is connected to the junction 272 and is the input of the threshold element 225 (FIGS. 10, 12). The cathode of the diode 275 (FIG. 12), the base of the transistor 273 and the first lead of a resistor 276 are connected at a junction point 277. The second lead of the resistor 276 is connected to the zero busbar 267. The collector of the transistor 273 is connected to the busbar 268. The emitter of the transistor 273, the base of the transistor 274 and the first lead of a resistor 278 are connected at a junction point 279. The second lead of the resistor 278 is connected to the zero busbar 267. The emitter of the transistor 274 is connected to the zero busbar 267 through a resistor 280. The collector of the transistor 274 and the first lead of a resistor 281 are connected at a junction point 282 and are the output of the threshold element 255 (FIGS. 10, 12). The electronic switch is built around transistors 283 and 284 (FIG. 12). The base of a transistor 283 and the first lead of a resistor 285 are connected together at a junction point 286, make up the input of the electronic switch 226 (FIGS. 10, 12) and are connected to the output of the threshold element 225 at the point 282 (FIG. 12) through a diode 287. The anode of diode 287 is connected to the junction 282 and its cathode is connected to the junction 286. The second lead of the resistor 285 is connected to the zero busbar 267. The emitter of a transistor 283, the base of the transistor 284 and the first lead of a resistor 288 are connected together at a junction point 289. The second lead of the resistor 288 and the emitter of the transistor 284 are connected to the zero busbar 267. The collector of the transistor 283 is connected to the busbar 268 through a resistor 290. The collector of the transistor 284 is connected to a terminal 291, makes up the output of the electronic switch 226 (FIGS. 10, 12) and serves as an output of the conversion unit 222 (223) (FIG. 10).

The electrical connection of the output terminals of the conversion units 222 and 223 (FIG. 10), according to the first embodiment, to the inputs of the actuating mechanism 3 and to a d-c voltage source (not shown) is effected as follows. The terminals 261 (FIG. 11) of the units 222 and 223 (FIGS. 10, 11) are connected respectively to the terminals 217 and 219 (FIG. 9) corresponding to the first and second inputs of the actuating mechanism 3 (FIGS. 9, 10).

The terminal of the zero busbar 232 (FIG. 11) of each of the units 222 and 223 (FIGS. 10, 11) is connected to the positive terminal of the d-c voltage source (not shown) whose negative terminal is connected to the terminals 216 and 218 (FIG. 9) of the actuating mechanism 3 (FIGS. 9, 10).

The electrical connection of the output terminals of the conversion units 222 and 223 (FIG. 10), made according to the second embodiment, with the inputs of the actuating mechanism 3 and with the d-c voltage source is effected as follows. The terminals 291 (FIG. 12) of the units 222 and 223 (FIGS. 10, 12) are connected to the terminals 216 and 218 (FIG. 9) of the first and second inputs of the actuating mechanism 3 (FIGS. 9, 10), respectively.

The terminal of the zero busbar 267 (FIG. 12) of each unit 222 and 223 (FIGS. 10, 12) is connected to the negative terminal of the d-c voltage source (not shown) whose positive terminal is connected to the terminals 217 and 219 (FIG. 9) of the actuating mechanism 3 (FIGS. 9, 10).

The operation of the proposed system is described by way of example for its use for automatic control of the movement of a transport vehicle (not shown) along the contrast program 11 (FIG. 2), the steering gear of the vehicle being equipped with a tracking hydraulic drive.

The system is mounted on the given transport vehicle in the following manner.

The device 1 (FIGS. 1, 2) is mounted at the front left-hand corner of the transport vehicle in its upper part, according to the specified parameters (not given in the specification). In this case the protective casing (not shown) of the device 1 is mechanically connected to the steering drive of the controlled front wheels of the vehicle so that the required feedback of the angle of rotation of the controlled wheels is provided.

The design parameters at a normal position of the transport vehicle and at a corresponding position of its steered wheels provide a required position of the contrast program 11 (FIG. 2) on that section of the surface 10, which will be the analyzed surface 13 after switching the system on. In this case the information scanner 1 is duly directed to the surface 10 lying ahead.

The processing unit 2 (FIG. 1) is placed in the cabin of the operator controlling the operation of the given system.

The actuating mechanism 3 is also mounted in the operator's cabin on the steering wheel shaft below the wheel, the output shaft 216 (FIG. 9) of this mechanism being mechanically coupled to the shaft of the steering wheel. In this case the operator is capable of controlling the movement of the vehicle with a switched-off system (e.g. during some auxiliary operations).

The above mentioned units of the system are electrically interconnected through a cable, which also provides electrical connection of the system with a d-c voltage source (not shown) mounted at any suitable place.

As soon as the mirror prism 14 (FIG. 2) starts rotating, the scanner 6 provides scanning of the analyzed surface 13.

In a general case the scanning surface 13 may be represented by a finite plurality of mutually adjoining elementary platforms having sufficiently small cross size along the contrast program 11 and having a length equal to the longitudinal size of the corresponding parts of the analyzed surface 13. Each of these elementary platforms, which are approximately equal in size, reflects a portion of the radiation flux towards the scanning device 1, said portion being determined by the radiation flux falling on the platform, the area, the physical parameters of the surface and the disposition of the irradiated surface.

The graph (FIG. 13a) shows the quantitative values B of the light fluxes reflected frame each elementary platform, wherein the transverse size of each elementary platform starting from the right-hand (on the device 1 side) boundary of the analyzed surface 13 are plotted successively on the abscissae axis (FIG. 2).

Figure 13:
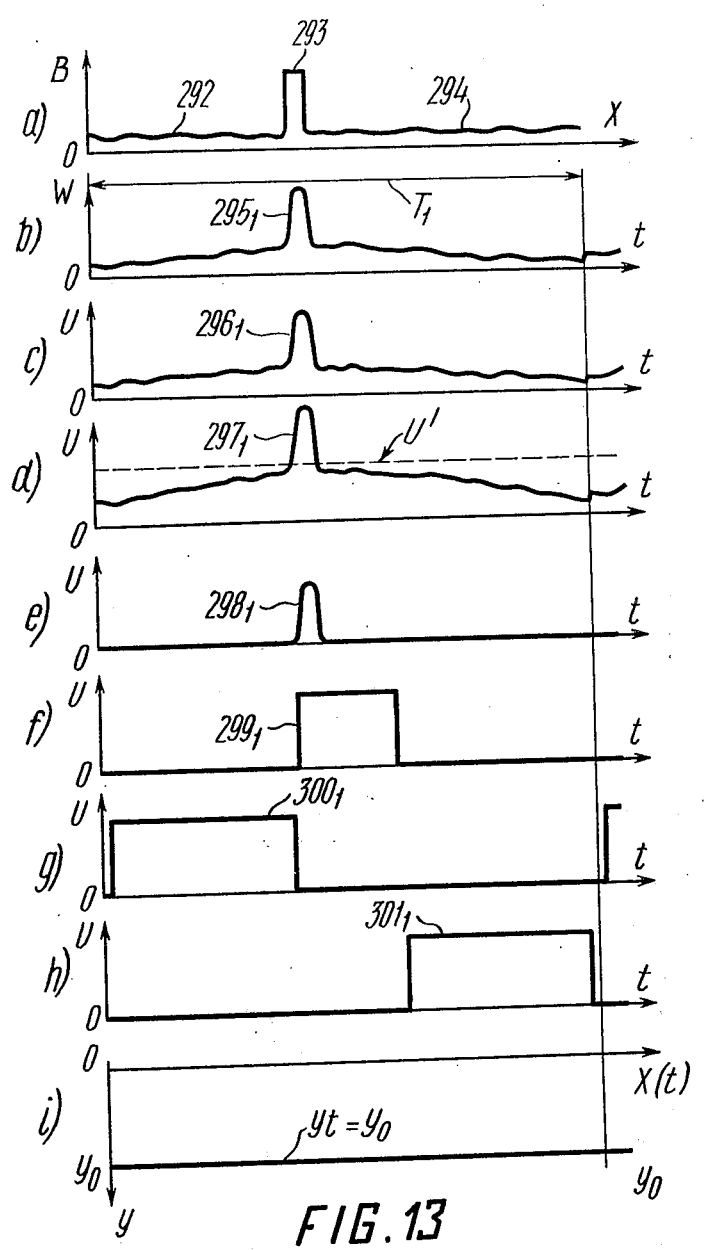

The section 292 shown in FIG. 13 a shows the distribution of the quantitative values B of the light flux emanated by that portion of the analyzed surface 13 (FIG. 2), which is located to the left (by the drawing) from the contrast program 11. The section 293 shown in FIG. 13 a illustrates the distribution of the quantitative values B of the light flux emanated by the contrast formation shaping the contrast program 11 (FIG. 2).

The section 294 shown in FIG. 13 a illustrates the distribution of the quantitative values B of the light flux emanated by that portion of the analyzed surface 13 (FIG. 2), which is located to the right (in the drawing) from the contrast program 11.

When scanning the analyzed surface 13, which is illuminated, for example, by an artificial light source, a light flux 21 is formed at the output of the scanner 6, said flux containing information on the analyzed surface 13.

It should be noted that the input signal of the device 1 is made up by the radiation flux (light flux) emanating from the surface 10 (lying in front of the given device 1) towards the device 1. However, only a portion of this radiation flux is received, namely, the light flux 21, which is a specified portion of this radiation flux, i.e. that portion which is transmitted (e.g. due to reflection) from the sensed surface 12.

Rotated synchronously with the mirror prism 14 is the marker disk 24 of the reference signal generator 5. This provides alternate transmission of the light flux from the lamps 26 and 27 to the photodiodes 28 and 29 respectively and this takes place in a specified position of the mirror prism 14 per each third of one turn of the marker disk 24. Therefore, photodiodes 28 and 29 together with the resistors 32 and 33, providing their normal operating conditions, produce electrical signals during each scanning cycle.

The light flux 21 applied to the photodiode 22 (FIG. 2, FIG. 3) is a signal carrying information on the analyzed surface 13 (FIG. 2) with the contrast program 11. This signal is periodic and comprises a pulse $295_1$ shown in FIG. 13b and carries information on the contrast program 11 (FIG. 2). The primary electrical signal taken from the photodiode 22 (FIG. 3) is also periodic and comprises a pulse $296_1$ shown in FIG. 13c. This signal is similar to the pulse $295_1$ (FIG. 13b) and, therefore, carries information on the contrast program 11 (FIG. 2).

This primary electrical signal $296_1$ (FIG. 13c) is fed to the signal input of the unit 2, (FIG. 1) i.e. to the input of the unit 8.

In the unit 8 (FIG. 1) the stages on the transistors 44, 52, 53, and 69 (FIG. 4) provide amplification of the primary electrical signal $296_1$ (FIG. 13c) both by current and voltage, the stage based on the transistor 81 (FIG. 4) being used for automatic gain control of the two-stage amplifier built around the transistors 52 and 53 by changing the a-c negative feedback in the emitter circuit of said transistors 52 and 53 by changing the control voltage across the diodes 86, 90 and 92.

This automatic control is effected by changing the amplitude of the primary electrical signal $296_1$ (FIG. 13c), which takes place in connection with a change in the level of illumination of the analyzed surface 13 (FIG. 2) and owing to the fact the various sections of the road covering, on which the vehicle will move, have different reflection factors. As a result, there is obtained a required degree of stability of the amplitude of the amplified electrical signal comprising a pulse 297 shown in FIG. 13d and fed to the input of the amplitude selector 94 (FIG. 4).

The amplitude selector 94 protects the next stages from penetration of that portion of the amplified signal $297_1$ (FIG. 13d), which corresponds to the weak contrasts on the analyzed surface 13 (FIG. 2) or is caused by constructional limitations of the scanner 6.

Shown in FIG. 13d by a dash line is a level U' of amplitude selection provided by the amplitude selector 94 (FIG. 4).

Produced at the output of the amplitude selector 94 is a useful signal in the form of an electrical pulse $298_1$ shown in FIG. 13e and carrying information on the contrast program 11 (FIG. 2) only. Thus, in the first scanning cycle $T_1$ (FIG. 13) the pulse $298_1$ (FIG. 13e) is produced when the contrast program 11 (FIG. 2) is received by the scanner 6.

The pulse $298_1$ (FIG. 13e) triggers the driven multivibrator built around the transistors 108 and 114 (FIG. 4) and forming a normalized electrical signal $299_1$ shown in FIG. 13f and having a predetermined duration and amplitude. This signal $299_1$ is taken from the output of the unit 8 (FIG. 1) from the collector of the transistor 114 (FIG. 4) and carries information on the contrast program 11 (FIG. 2). The time of existence of this signal $299_1$ (FIG. 13f) during each scanning cycle T corresponds to the location of the contrast program 11 (FIG. 2) within the zone of the analyzed surface 13, therefore, it corresponds to the position of the vehicle with respect to the contrast program 11 (FIG. 2), since the device 1 is attached to the vehicle.

If $Y_t = Y_o$ (FIG. 13i), the reference electrical signals $300_1$ shown in FIG. 13g and $301_1$ shown in FIG. 13h sent respectively to the terminals 35 and 37 (FIG. 2) of the reference signal generator 5, and the normalized electrical signal $299_1$ (FIG. 13f), produced by the unit 8 (FIG. 1) from the collector of the transistor 111 (FIG. 4), are shifted in time as shown on the time diagrams (FIG. 13f, g, h). At $\Delta Y = 0$ such a time shift is maintained in each scanning cycle T. These signals $299_1$, $300_1$, $301_1$ (FIG. 13f, g, h) are fed to the inputs of the logical circuit 9 (FIG. 1).

The operation of the logical circuit 9 is explained by three typical cases, when the transport vehicle is in three different positions with respect to the contrast program 11 (FIG. 2);

the first case when $Y = Y_o$ (cycle $T_n$, FIG. 14a);
the second case when $Y < Y_o$ (cycle $T_k$);
the third case when $Y > Y_o$ (cycle $T_m$).

In any case both embodiments of the logical circuit 9 (FIG. 5, FIG. 6, FIG. 7, FIG. 8) operate similarly.

Figure 14:
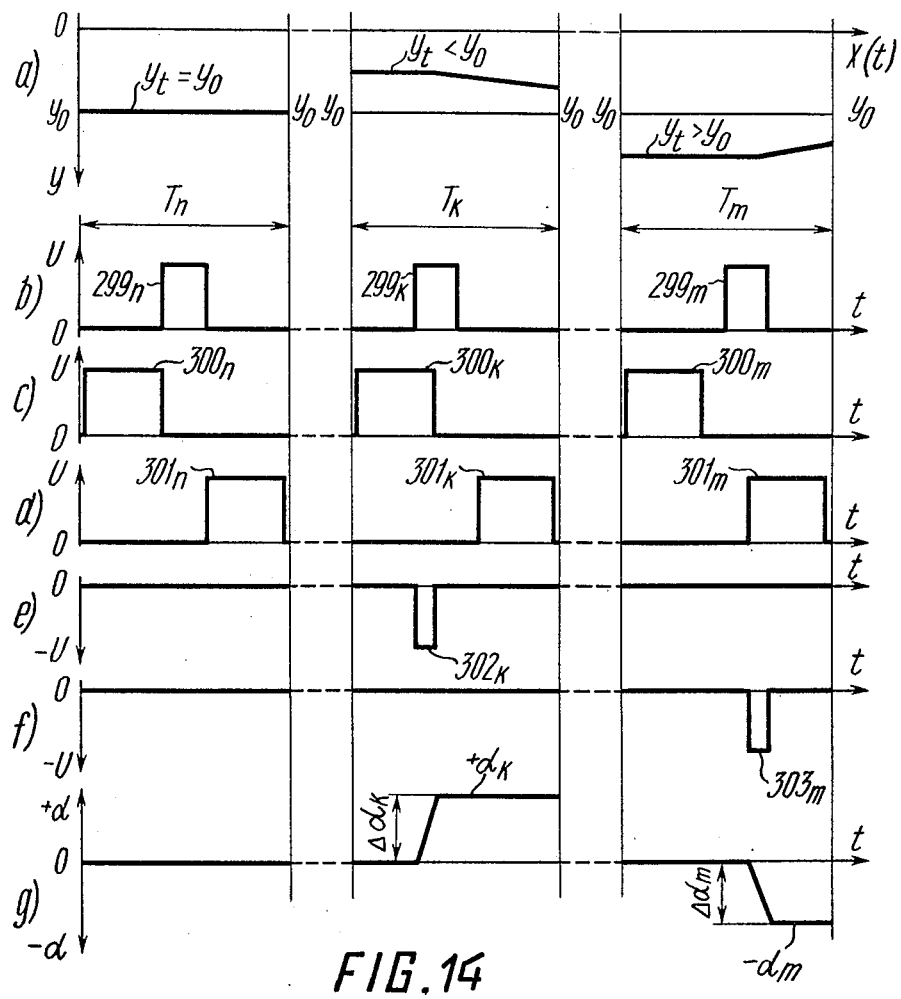

The first case is considered in the scanning cycle $T_n$ (FIG. 14). The processes occurring in the system produce signals $299_n$, $300_n$ and $301_n$ at the outputs of the generator 5 (FIG. 1) and at the output of the unit 8, which are shown, respectively, in FIGS. 14b, c, d. These signals are subject to logical processing; their time position is similar to the time position of the signals $299_1$ (FIG. 13f), $300_1$ (FIGS. 13g) and $301_1$ (FIG. 13h) described in the scanning cycle $T_1$ (FIG. 13).

From the beginning of this cycle $T_n$ (FIG. 14) the reference electrical signal $300_n$ (FIG. 14c) is fed to the first marker input of the logical circuit 9 (FIG. 5 or FIG. 7), to the terminal 132 (FIG. 6) or to the terminal 173 (FIG. 8). After this first reference signal $300_n$ (FIG. 14c) is terminated, a normalized electrical signal $299_n$ (FIG. 14b) is fed to the signal input of the logical circuit 9 (FIG. 5 or FIG. 7), to the terminal 163 (FIG. 6) or to the terminal 184 (FIG. 8). After terminating this normalized signal $299_n$, (FIG. 14b), the second reference signal $301_n$ (FIG. 14d) is fed to the second marker input of the logical circuit 9 (FIG. 5 or FIG. 7), to the terminal 149 (FIG. 6) or to the terminal 189 (FIG. 8). The signals are processed by circuits 123, 124 and 125, 126 (FIG. 5) of the first channel 121 and the second channel 122, respectively, in the logical circuit 9 according to the first embodiment and also by the switch circuits 166, 167 and 168 (FIG. 7) forming channels 164 and 165 in the logical circuit 9 according to the second embodiment.

All switch circuits 123, 124, 125, 126, 166, 167 and 168 (FIGS. 5 and 7) of the both embodiments of the logical circuit 9 in their initial position are closed by the voltage fed to the busbar 138 (FIG. 6) in the first embodiment or to the busbar 179 (FIG. 8) in the second embodiment. This voltage renders nonconductive the transistors 127, 128 and 129, 130 (FIG. 6) in the first embodiment and the transistors 169, 170 and 171 (FIG. 8) in the second embodiment.

The signals $300_n$, $299_n$, $301_n$ (FIG. 14c, b, d) fed from the terminals 132, 163, 149 (FIG. 6) to the bases of the transistors 128, 127 and 129, 130, respectively, or from the terminals 173, 184, 189 (FIG. 8) to the bases of the transistors 169, 170, 171, respectively, render conductive the corresponding switch circuits 124, 123 and 125, 126. (FIG. 5) of the first embodiment or 166, 167, 168 (FIG. 7) of the second embodiment during a respective interval of time.

At such a sequence of switching, owing to the series connection of the switch circuits 123, 124 (FIG. 5) of the first channel 121 and the switch circuits 125, 126 of the second channel 122 of the first embodiment of the logical circuit 9 (FIG. 1), as well as the switch circuits 166, 167 (FIG. 7) of the first channel 164 and the switch circuits 167, 168 of the second channel 165 in the second embodiment of the logical circuit 9 (FIG. 1), no output pulses are produced on the collectors of the transistors 128 or 130 (FIG. 6) of the first embodiment and on the collectors of the transistors 169 or 171 (FIG. 8) of the second embodiment.

Therefore, in the given case there is no output signals on the output terminals 147 and 161 (FIG. 6) of the first embodiment of the logical circuit 9 (FIG. 5), as well as on the output terminals 194 and 198 (FIG. 8) of the second embodiment of the logical circuit 9 (FIG. 7).

As mentioned above, in the second case in the process of movement along the contrast program 11 (FIG. 2), the vehicle has another transverse coordinate $Y_t$ FIG. 14a; cycle $T_k$. For example, if the distance of 0.5 m from the left-hand side of the vehicle to the contrast program 11 (FIG. 2) (the latter is to the left from the vehicle) is considered as a normal value of the transverse coordinate $Y_o$ (FIGS. 2, 13, 14), during the right turn of the vehicle (even with a large radius) the transverse coordinate $Y_t$ will start decreasing correspondingly. In this case a new value of the transverse coordinate $Y_t$ differing from the specified value $Y_o$, will start forming at a certain instant of time. Assume this instant corresponds to the beginning of the scanning cycle $T_k$ shown in FIG. 14 with a reference numeral k. Then, owing to the changed position of the contrast program 11 (FIG. 2) in the zone of the analyzed surface 13 (changes not shown in the diagram) the normalized signal $299_k$ shown in FIG. 14b has partially the same life time as the first reference signal $300_k$ shown in FIG. 14c, which is possible when the scanning is directed from right to left in accordance with FIG. 2.

The signals $299_k$ (FIG. 14b), $300_k$ (FIG. 14c) and the second reference signal $301_k$ shown in FIG. 14c, which, like the signals $299_n$, $300_n$ and $301_n$ (FIGS. 14b, c, d), are fed to the corresponding switch circuits 123, 124, 125, 126 and 166, 167, 168 (FIGS. 5, 7) of the logical circuit 9, are processed by this circuit.

In this case, during the time interval when the signal $299_k$ (FIG. 14b) is coincident with the signal $300_k$ (FIG. 14c), the switch circuits 124 and 123 (FIG. 5) of the first embodiment, as well as the switch circuits 166 and 167 (FIG. 7) of the second embodiment of the logical circuit 9 (FIG. 5 and FIG. 7), are rendered conducting simultaneously. Therefore, output pulses are produced on the collector of the transistor 128 (FIG. 6) of the first embodiment and on the collector of the transistor 169 (FIG. 8) of the second embodiment. Therefore, in this second case, at the first output of the logical circuit 9 (FIG. 5 or FIG. 7) at the terminal 147 (FIG. 6), or in the second embodiment of the terminal 194 (FIG. 8), there is produced a pulse $302_k$, shown in FIG. 14e, whose duration is equal to the time of coincidence of the first reference signal $300_k$ (FIG. 14c) and the signal $299_k$ (FIG. 14b) carrying information on the contrast program 11 (FIG. 2). This pulse $302_k$ (FIG. 14e) applied to the first input of the actuating mechanism 3 (FIG. 1) on the terminals 216 and 217 (FIG. 9) makes it operate during a corresponding interval of time. As a result, the output shaft 221 (FIG. 9) turns through an angle $\Delta\alpha$ shown in FIG. 14g with respect to the preceding position. FIG. 14g shows a change in the angular position of the output shaft 221 (FIG. 9) of the actuating mechanism 3 (FIG. 1) in the scanning cycle $T_k$ (FIG. 14). In this case the output shaft 216 (FIG. 9) occupies an angular position equal to $+\alpha_k$ (FIG. 14g) with respect to the position corresponding to the linear movement of the vehicle and sends a control signal to the steering mechanism of the vehicle thus turning the steered wheels of the vehicle through a corresponding angle. Thus, the transport vehicle is moved along the contrast program 11 (FIG. 2) when $Y_t < Y_o$ (FIGS. 2, 13), the scanning cycle $T_n$ (FIG. 14).

In the third case, when the linear section of movement of the vehicle is followed by a left turn, the transverse coorfinate $Y_t$ (FIGS. 2, 13) starts correspondingly increasing, in which case, at a certain moment of time, there is formed another value of the transverse coordinate $Y_n$ which is not equal to the specified value. Assume that this moment corresponds to the beginning of the scanning cycle $T_m$ shown in FIG. 14. Then the normalized signal $299_m$ shown in FIG. 14b coincides with the second reference pulse $301m$ shown in FIG. 14d. The signals $299_m$ (FIG. 14b) and $301_m$ (FIG. 14d), as well as the first reference signal $300_m$ shown in FIG. 14c, are applied, like the signals $299_n$, $300_n$ and $301_n$ (FIGS. 14b, c, d), to the corresponding switch circuits 123, 124, 126 and 166, 167, 168 (FIGS. 5, 7) of the logical circuit 9 (FIG. 1) and are processed by this logical circuit 9.

In this case, in the time interval when the signal $299m$ (FIG. 14b) coincides with the signal $301m$ (FIG. 14d), the switch circuits 125 and 126 (FIG. 5) of the first embodiment, as well as the switch circuits 167 and 168 (FIG. 7) of the second embodiment, are rendered conductive simultaneously. Therefore, an output pulse is produced on the collector of the transistor 130 (FIG. 6) of the first embodiment and on the collector of the transistor 171 (FIG. 8) of the second embodiment.

Consequently, a pulse $303_m$ shown in FIG. 14f is produced in this third case at the second output of the logical circuit 9 (FIG. 5 or FIG. 7) terminal 161 in FIG. 6 and terminal 198 in FIG. 8. The duration of this pulse is equal to the time of coincidence of the second reference signal $301_m$ in (FIG. 14d) and the signal $299_m$ (FIG. 14b) carrying information on the contrast program 11 (FIG. 2). This pulse, when applied to the second input of the actuating mechanism 3 (FIG. 1) at the terminals 218 and 219 (FIG. 9), makes this mechanism to operate during a certain period of time. As a result, the output shaft 221 (FIG. 9) of the actuating mechanism 3 (FIG. 1) turns through a definite andle $\Delta\alpha_m$ shown in FIG. 14g and occupies a new position equal to $\alpha_m$ with respect to its former position. Like in the preceding case, the rotation of the output shaft 221 (FIG. 9) controls the direction of the vehicle.

Thus, in the above three typical cases the time position of the reference signals $300_l$, $300_n$, $300_k$, $300_m$ and $301_l$, $301_n$, $391_k$, $301_m$ (FIGS. 13g, h and FIGS. 14c, d) in each scanning cycle $T_1$, $T_n$, $T_k$ and $T_m$ is constant, while the signals $299_1$, $299_n$, $299_k$, $299_m$ carrying information on the contrast program 11 (FIG. 2) for each scanning cycle $T_1$, $T_n$, $T_k$ and $T_m$ (FIGS. 13, 14) are dependent on the position of the contrast program 11 (FIG. 2) within the zone of the analyzed surface 13.

The following technique is used for obtaining complete data on the high-speed processing of the appearing mismatch $\Delta Y (\Delta Y = Y - Y)$ along the transverse coordinate $(Y_t \rightarrow Y_o)$.

Figure 15:
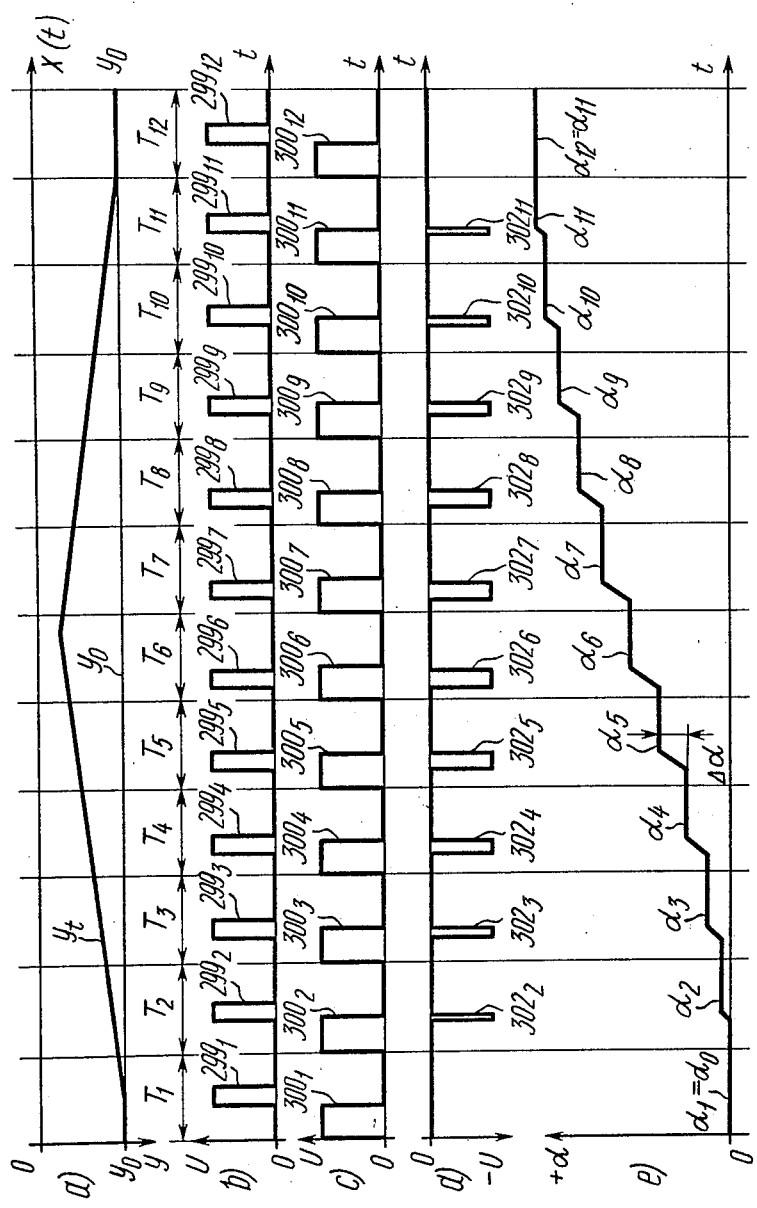

The contrast program 11 (FIG. 2) is laid on the road so that the linear section is followed by a special test section with such a path of variable radius (turn) that a vehicle having a speed of V = 10 m/sec is not capable of overcoming this section without a considerable error along the transverse coordinate $Y_t$. Furthermore, the path is selected such that the system tested at a scanning cycle T of 40 millisecond operates under such conditions that, when the mismatch $\Delta Y$ increases linearly from zero to maximum, it linearly decreases to zero and remains unchanged. The length of such a section does not exceed 5 meters. Thus obtained data is shown in FIG. 15 when the contrast program 11 (FIG. 2) is turned "to the right". The deviation of the actual transverse coordinate $Y_t$ from the specified transverse coordinate $Y_o$ during a time period equal to 0.42 sec. is shown in FIG. 15a.

In accordance with $\Delta Y$ the logical circuit 9 (FIG. 1) processes the signals $299_1$, $299_2$, $299_3$, $299_4$, $299_5$, $299_6$, $299_7$, $299_8$, $299_9$, $299_{10}$, $299_{11}$, $299_{12}$, (FIG. 15b) and $300_1$, $300_2$, $300_3$, $300_4$, $300_5$, $300_6$, $300_7$, $300_8$, $300_9$, $300_{10}$, $300_{11}$, $300_{12}$ (FIG. 15e) during the corresponding scanning cycles T, similar to the processing of the signals $299_k$ (FIG. 14b) and $300_k$ (FIG. 14c). During this processing at the first output of the logical circuit 9 (FIG. 5 or FIG. 7), at terminal in 147 FIG. 6 and at terminal 194 FIG. 8, there are produced electrical pulses $302_2$, $302_3$, $302_4$, $302_5$, $302_6$, $302_7$, $302_8$, $302_9$, $302_{10}$, $302_{11}$ (FIG. 15d) whose duration corresponds to $\Delta Y$.

The pulses $302_2$, $302_3$, $302_4$, $302_5$, $302_6$, $302_7$, $302_8$, $302_9$, $302_{10}$, and $302_{11}$ applied to the first input of the actuating mechanism 3 (FIG. 1) across the terminals 216 and 217 (FIG. 9) make it operate during corresponding intervals of time. As a result, the angular position $\alpha$ FIG. 15e of the output shaft 221 (FIG. 9) of the actuating mechanism 3 (FIG. 1) changes in a necessary direction the steering of the vehicle.

Thus, the given system detects the mismatch $\Delta Y$ not later than after a time interval equal to the duration of one scanning cycle T, while the signal produced by the logical circuit 9 (FIG. 1) in presence of the mismatch $\Delta Y$ is a continuous train of periodically following pulses $302_2$, $302_3$, $302_4$, $302_5$, and $302_6$, $302_7$, $302_8$, $302_9$, $302_{10}$, $302_{11}$ (FIG. 15d) whose duration increases monotonically starting from low values up to the value equal to the duration of the normalized signals (FIG. 15b) of the unit 8 (FIG. 1), if $\Delta Y$ increases linearly, while in the case of linear decrease of $\Delta Y$, the duration of the pulses decreases monotonically to the low values.

At the same time, the output shaft 221 (FIG. 9) of the actuating mechanism 3 (FIG. 1) sends control signals to the steering mechanism of the transport vehicle at a speed proportional to the value of the mismatch $\Delta Y$.

The system for automatic control of an object, in which the processing unit 2 (FIG. 10) comprises conversion units 222 and 223 connected to the outputs of the logical circuit 9, operates as follows.

The information scanner 1 and unit 8 in this case operate like described above. The logical circuit 9 processes the input signals also as described above. The units 222 and 223 operate identically; therefore, the operation of only one of them, e.g. unit 222, is described below.

Both embodiments of the conversion units 222 and 223 (FIGS. 10, 11, 12) make is possible to effect two different operating conditions: linear control conditions or linear control conditions for the actuating mechanism 3 (FIG. 10).

To perform the linear control conditions, the parameters of the integrating circuit 224 (FIG. 10) and of the threshold element 225 are specified such that they can expand the length of the pulses fed from the logical circuit 9.

For example, using the above-described technique, the test section having a length of about four meters is provided with such a direction of the contrast program 11 (FIG. 2) that the transport vehicle steered by the proposed system and moving at a constant speed of 20 m/sec passes this section with a linearly varying mismatch $\Delta Y$ shown in FIG. 16a. In this case, at a duration of the scanning cycle equal to 20 milliseconds the operation of the logical circuit 9 (FIG. 10) provides supply of the unit 222 with a train of electrical pulses $302_2$, $302_3$, $302_4$, $302_5$, $302_6$, $302_7$, $302_8$, $302_9$ shown in FIG. 16b, which corresponds to $\Delta Y$.

In the first embodiment of the conversion unit 222 and 223 (FIG. 10) the integrating circuit 224 (FIG. 11) is made so that its d-c operating conditions provide its insensitivity to weak noise signals, which sometimes appear at the input. This is provided by the diode 229 and dividers based on the resistors 227, 228 and 235, 236. At the same time, the divider based on the resistors 235, 236 provides at the output of the integrating circuit 224 a required initial voltage lower than the threshold of operation and also lower than the threshold of cutting off the threshold element 225 following this circuit.

In the second embodiment of the conversion units 222, 223 (FIG. 10) the integrating circuit 224 (FIG. 12) is similar to that in the first embodiment. Its d-c operating conditions also provides the required noise signal immunity; furthermore, its initial output voltage provides an initial (normal) state of the threshold element 225 following this circuit.

The pulses $302_2$, $302_3$, $302_4$, $302_5$, $302_6$, $302_7$, $302_8$, $302_9$ from the terminal 147 (FIG. 6) of the first embodiment of the logical circuit 9 FIG. 5 or from the terminal 194 (FIG. 8) of the second embodiment of the logical circuit 9 (FIG. 7) are applied to the terminal 231 (FIG. 11) of the first embodiment of the conversion unit 222 (FIG. 10) or to the terminal 266 (FIG. 12) of the second embodiment of the conversion unit 222 (FIG. 10) and are converted by the respective integrating circuits 224 (FIG. 11) or 224 (FIG. 12) into electrical signals $304_2$, $304_3$, $304_4$, $304_5$, $304_6$, $304_7$, $304_8$, $304_9$ shown in FIG. 16c, which are applied to the threshold elements 225 (FIG. 11) or 225 (FIG. 12) respectively.

In the first embodiment of the conversion unit 222 (FIG. 10) its threshold element 225 (FIG. 11) with the coupled emitters of the transistors 240 and 241 (it is usually called the Schmitt trigger circuit) operates under its conventional d-c conditions. The resistor 239 provides for matching the input of the threshold element 225 with the output of the integrating circuit 224.

In the second embodiment of the conversion unit 222 (FIG. 12) its threshold element 225 (FIG. 12) in its initial state features such d-c operating conditions that its output transistor 274 is rendered conductive (saturated).

The threshold element 225 (FIG. 11) controlled by the voltage acting at the output of the integrating circuit 224 is switched over from its initial state to the operating condition as soon as the input voltage level exceeds the threshold of its operation and is switched back to its initial state as soon as the level of the input voltage becomes lower that its threshold cut-off value. Output electrical pulses $305_2$, $305_3$, $305_4$, $305_5$, $305_6$, $305_7$, $305_8$, $305_9$ shown in FIG. 16d are formed on the collector of the transistor 241. These pulses are applied to the electronic switch 226 (FIG. 11). FIG. 16d shows the reverse polarity.

The threshold element 225 (FIG. 12) controlled by the voltage acting at the output of the integrating circuit 224 of the second embodiment of the conversion unit 222 (FIG. 10) is switched over from its initial state to the operating condition as soon as the output voltage of the integrating circuit 224 (FIG. 12) becomes lower than the specified value. In this case the output transistor 241 is deenergized forming at the output of the threshold element 224 the output pulses $305_2$, $305_3$, $305_4$, $305_5$, $305_6$, $305_7$, $305_8$, $305_9$ (FIG. 16d) having positive polarity and applied to the input of the electronic switch 226 (FIG. 12).

Thus, the integrating circuit 224 (FIG. 11) or 224 (FIG. 12) together with the threshold element 225 (FIG. 11) or 225 (FIG. 12) respectively, under linear operating conditions, converts the pulses $302_2$, $302_3$, $302_4$, $302_5$, $302_6$, $302_7$, $302_8$, $302_9$ (FIG. 16b), supplied from the output of the logical circuit 9 (FIG. 10), into pulses $305_2$, $305_3$, $305_4$, $305_5$, $305_6$, $305_7$, $305_8$, $305_9$ (FIG. 16d) the duration of which corresponds to $\Delta Y$; furthermore, their amplitude exceeds that of the initial pulses by a specified factor.

The construction and operating conditions of the electronic switch 226 (FIG. 11) render the transistors 253, 254 nonconductive in their initial conditions, the diode 257 being also rendered nonconductive in its initial state. When the pulses $305_2$, $305_3$, $305_4$, $305_5$, $305_6$, $305_7$, $305_8$, $305_9$ are applied to the input of the electronic switch 226 (FIG. 14d) the transistors 253, 254 (FIG. 11) are switched over to their operating condition (satured state). This provides control of the flow of the electric energy fed from the d-c source to the input of the actuating mechanism 3 (FIG. 10). In this case th electrical pulses $306_2$, $306_3$, $306_4$, $306_5$, $306_6$, $306_7$, $306_8$, $306_9$ shown with initial negative level in FIG. 16e act at the output (terminal 261 (FIG. 11) of the electronic switch 266. These signals from the terminal 261 (FIG. 11) are fed to the terminal 217 (FIG. 9).

The design and operating conditions of the second embodiment of the electronic switch 266 (FIG. 12) are similar to those of the first embodiment described above.

The actuating mechanism 3 (FIG. 10) acted on by the pulses $306_2$, $306_3$, $306_4$, $306_5$, $306_6$, $306_7$, $306_8$, $306_9$ (FIG. 16e) operates during corresponding intervals of time. In this case the output shaft 221 (FIG. 9) changes its angular position $\alpha$ (FIG. 16f) when controlling the object, the change $\Delta\alpha$ in the angular position during each scanning cycle T corresponds to $\Delta Y$. Thus, the rotational speed of the output shaft 221 (FIG. 9) of the actuating mechanism 3 (FIG. 10) depends on $\Delta Y$. This provides the linear control conditions, while a low repetition frequency of the pulses $306_2$, $306_3$, $306_4$, $306_5$, $306_6$, $306_7$, $306_8$, $306_9$ (FIG. 16e) produced by the conversion unit 222 or 223 (FIG. 10) makes it possible to simplify the design of the powdery electromagnetic couplings 204, 209 (FIG. 9) in the actuating mechanism 3 (FIG. 10) and to increase its output power.

The relay control conditions are provided by adjustment of the conversion units 222 and 223 (FIG. 10), e.g. by selecting the elements 237, 239 (FIG. 11) in the first embodiment and by selecting the elements 270, 280

(FIG. 12) in the second embodiment. This adjustment is effected so that the integrating circuit 224 (FIG. 10) and the threshold element 225, taken in combination, record the trains of pulses fed from the logical circuit 9. At the same time, suitable values of duration of the electrical signals produced by the generator 5 and by the forming unit 8 can be set up.

Figure 17:
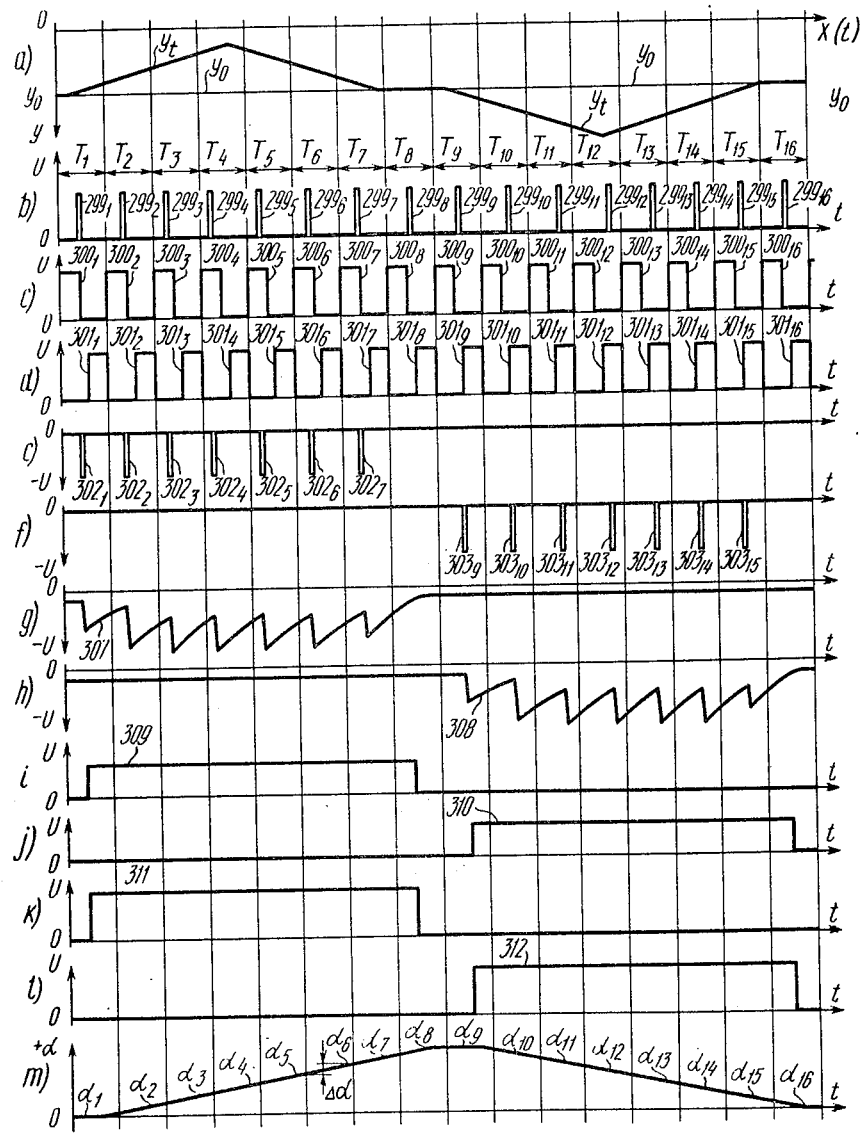

For example, the technique described above and used on a test section about 2.4 m long can provide such a direction of the contrast program 11 (FIG. 2) that the given vehicle controlled by the proposed system and moving at a speed of 15 m/sec passes this section with the linearly variable mismatch $\Delta Y$ shown in FIG. 17a. Having selected a duration of the scanning cycle T equal to 10 milliseconds, it is appropriate to specify the duration of the signals $299_1, 299_2, 299_3, 299_4, 299_5, 299_6, 299_7, 299_8, 299_9, 299_{10}, 299_{11}, 299_{12}, 299_{13}, 299_{14}, 299_{15}, 299_{16}$ shown in FIG. 17b and produced by the unit 8 (FIG. 10), and of the reference signals $300_1, 300_2, 300_3, 300_4, 300_5, 300_6, 300_7, 300_8, 300_9, 300_{10}, 300_{11}, 300_{12}, 300_{13}, 300_{14}, 300_{15}, 300_{16}$ shown in FIG. 17c, as well as of the signals $301_1, 301_2, 301_3, 301_4, 301_5, 301_6, 301_7, 301_8, 301_9, 301_{10}, 301_{11}, 301_{12}, 301_{13}, 301_{14}, 301_{15}, 301_{16}$, shown in FIG. 17d and produced by the generator 5 (FIG. 10) so as to provide the required insensitivity of the system to small values of $\Delta Y$. In this case when $\Delta Y$ exceeds the predetermined insensitivity range of the system, the operation of the logical circuit 9 (FIG. 10) provides, in correspondence with the $\Delta Y$ sign, a supply to the conversion units 222 and 223 of trains of electrical pulses $302_1, 302_2, 302_3, 302_4, 302_5, 302_6, 302_7$ shown in FIG. 17e and pulses $303_9, 301_{10}, 303_{11}, 303_{12}, 303_{13}, 303_{14}, 303_{15}$ shown in FIG. 17, respectively, which through the integrating circuit 224 (FIG. 10) of the conversion unit 222 are converted into an electrical signal shown in FIG. 17g and through the integrating circuit 224 (FIG. 10) of the conversion unit 223 are converted into an electrical signal 308 shown in FIG. 17h. The signal 307 (FIG. 17g) supplied to the threshold element 225 (FIG. 10) of the conversion unit 222 is converted thereby into an electrical signal 309 shown in FIG. 17i. The signal 308 (FIG. 17h) supplied to the threshold element 225 (FIG. 10) of the conversion unit 223 is converted thereby into and electrical signal 310 shown in FIG. 17j.

Thus, the recording of the series of pulses carrying information on $\Delta Y$ is effected by means of conversion.

The electronic switch 266 (FIG. 10) of the conversion unit 222 controlled by the threshold element 225 feeds the electrical siganl 311 shown in FIG. 17k to the first input of the actuating mechanism 3 (terminals 216, 217, FIG. 9).

The electronic switch 226 (FIG. 10) of the conversion unit 223 controlled by the threshold element 225 feeds the electrical signal 312 shown in FIG. 17l to the second input of the actuating mechanism 3 (terminals 218, 219, FIG. 9).

The actuating mechanism 3 (FIG. 10), operating alternately for corresponding periods of time, turns its output shaft 221 (FIG. 9) in the corresponding directions while changing its angular position $\alpha$ (FIG. 17m) at a constant speed thus performing relay control of the direction of movement of the vehicle.

Each embodiment of the conversion units 222, 223 (FIGS. 11, 12) is preferably used for definite operating conditions of the system.

The first embodiment of the units 222, 223 (FIG. 11) is preferably used in a high-speed system featuring linear operating conditions; in this case the high speed of response of its threshold element is realized most effectively.

The second embodiment is preferably used either in systems with very long scanning cycles under any operating conditions or in high-speed system operating under relay conditions. In this case the comparatively low speed of response of the threshold element 225 (FIG. 12), which hinder the operation of the electronic switch 226, is acceptible because of the relative simplicity of said threshold element 225.

The proposed invention provides for automatic control of the motion of a mobile object by a contrast program at a high speed. It ensures a high accuracy of movement of the object by the contrast program and adequate reliability both in the sense of safety and in the sense of occasional turns in the case of discontinuites in the contrast program. Similar indices are provided during the automatic control of a stationary object by a movable contrast program.

As a whole, the invention offers a considerable economical effect at the expense of making many technological operations, transportion, etc. automatically with increased efficiency.

What is claimed is:

1. A system for automatic control of an object by a contrast program comprising:

an information scanner producing electrical signals whose combination carries information on the coordinate of said contrast program on an analyzed surface and having an input, which is an input of said system, a signal output, a first marker output and a second marker output, said information scanner including a reference signal generator and a conversion unit for conversion of a specified portion of a radiation flux into an electrical signal carrying information on said contrast program, said conversion unit having an input, which is said input of said information scanner, a first output, and a second output, said unit for conversion including scanning means having an input, which is the input of said conversion unit, a first output and, a second output, and a receiver converting the radiation flux having an input and an output, which is said second output of said conversion unit and serves as said signal output of said information scanner, said input of said receiver being connected to said first output of said scanning means, said reference signal generator producing electrical signals carrying information on the scanning of said analyzed surface and having an input and first and second marker outputs which are, respectively, the first and second marker outputs of said information scanner, said second output of said scanning means being connected to said input of said reference signal generators;

a processing unit for processing the electrical signals carrying information on said contrast program and on said analyzed surface having a signal input, first and second marker inputs, and first and second outputs, said signal input of said processing unit being connected to said signal output of said information scanner, said first and second marker inputs of said processing circuit being connected, respectively, to said first and second marker outputs of said information scanner, said processing unit including a forming unit for forming normalized electrical signals carrying information on said contrast program having a signal input, which is said signal input of the processing unit, and a signal output, and a logical circuit, for processing the electrical signals carrying information on said contrast program and on the scanning of said analyzed surface and for producing the electrical signals carrying information on the deviation of said object from the specified position with respect to said contrast program, having a signal input, first and second marker inputs, which are respectively said first and second marker inputs of said processing unit, and first and second outputs, which are respectively said first and second outputs of said processing unit, said signal input of said logical signal being connected to said signal output of said forming unit; and an actuating mechanism executing the commands to control said object and having first and second inputs and an output, which is the output of said system, said first and second inputs of said actuating mechanism being connected, respectively, to said first and second output of the processing unit.

2. A system for automatic control of an object by a contrast program according to claim 1, wherein said logical circuit is made in the form of a two-channel coincidence circuit, which includes:

a first channel having a signal input, a marker input, which is the first marker input of said logical circuit, and an output, which is the first said output of said circuit; and a second channel having a signal input, a marker input, which is the second marker input of said logical circuit, and an output, which is said second output of said circuit, said signal inputs of said first and second channels being connected together and serving as said signal input of said logical circuit.

3. A system for automatic control of an object by a contrast program according to claim 1, wherein said processing unit has two conversion units for conversion of the electrical signals carrying information on the deviation of said object from the specified position with respect to said contrast program into electrical signals controlling said actuating mechanism executing the commands to control said object, each of said conversion units having an input and an output, which is one of the outputs of said processing unit, said inputs of said conversion units being connected, respectively, to said first and second outputs of said logical circuit.

4. A system for automatic control of an object by a contrast program according to claim 2, wherein said processing unit has two conversion units for conversion of the electrical signals carrying information on the deviation of said object from the specified position with respect to said contrast program into electrical signals controlling said actuating mechanism executing the commands to control said object, each of said conversion units having an input and an output, which is one of said outputs of said processing unit, said inputs of said conversion units being connected, respectively, to said first and second outputs of said logical circuit.

5. A system for automatic control of an object by a contrast program according to claim 3, wherein each of said conversion units of said processing unit comprises:

an integrating circuit having an input, which is said input of said conversion unit, and an output;

a threshold element having an input and an output, said input of said threshold element being connected to said output of said integrating circuit; and an electronic switch having an input and an output, which is said output of said conversion unit, said input of said electronic switch being connected to said output of said threshold element.

6. A system for automatic control of an object by a contrast program according to claim 4, wherein said conversion units of said processing units comprises:

an integrating circuit having an input, which is said input of said conversion unit, and an output;

a threshold element having an input and an output, said input of said threshold element being connected to said output of said integrating circuit; and an electronic switch having an input and an output, which is said output of said conversion unit, said input of said electronic switch being connected to said output of said threshold element.

7. A system for automatic control of an object by a contrast program according to claim 2, wherein said first and second channels are made up of switch circuits.

8. A system for automatic control of an object by a contrast program according to claim 7, wherein said first channel includes a first and a second switch circuit, an input of said first switch circuit being connected to said signal input of said first channel, an output of said first switch circuit being connected to a first input of said second switch circuit, a second input of said second switch being connected to said marker input of said first channel, and an output of said second switch being connected to said output of said first channel; and wherein said second channel includes a first and a second switch circuit, an input of said first switch circuit being connected to said signal input of said second channel, an output of said first switch circuit being connected to a first input of said second switch circuit, a second input of said second switch being connected to said marker input of said second channel, and an output of said second switch being connected to said output of said second channel.

9. A system for automatic control of an object by a contrast program according to claim 7, wherein said logical circuit includes a first, a second and a third switch circuit, said first switch circuit being included in said first channel, said second switch circuit being included in said second channel, said third switch circuit being common to both channels, an input of said third switch circuit being connected to said signal input of each channel, an output of said third switch circuit being connected to a first input of each channel, a second input of said first switch circuit being connected to said marker input of said first channel, an output of said first switch circuit being connected to said output of said first channel, a second input of said second switch circuit being connected to said marker input of said second channel, and an output of said second switch circuit being connected to said output of said second channel.

* * * * *